US011334753B2

(12) United States Patent
Vallespi-Gonzalez et al.

(10) Patent No.: US 11,334,753 B2
(45) Date of Patent: May 17, 2022

(54) TRAFFIC SIGNAL STATE CLASSIFICATION FOR AUTONOMOUS VEHICLES

(71) Applicant: UATC, LLC, San Francisco, CA (US)

(72) Inventors: Carlos Vallespi-Gonzalez, Pittsburgh, PA (US); Joseph Lawrence Amato, Pittsburgh, PA (US); Gregory P. Meyer, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 645 days.

(21) Appl. No.: 16/038,789

(22) Filed: Jul. 18, 2018

(65) Prior Publication Data

US 2019/0332875 A1 Oct. 31, 2019

Related U.S. Application Data

(60) Provisional application No. 62/664,672, filed on Apr. 30, 2018.

(51) Int. Cl.
*G06K 9/00* (2006.01)
*G06K 9/62* (2006.01)
(Continued)

(52) U.S. Cl.
CPC ....... *G06K 9/00825* (2013.01); *G05D 1/0088* (2013.01); *G06F 16/29* (2019.01);
(Continued)

(58) Field of Classification Search
None
See application file for complete search history.

(56) References Cited

U.S. PATENT DOCUMENTS 2,442,851 A 6/1948 Halstead
3,656,099 A 4/1972 Campbell
(Continued)

FOREIGN PATENT DOCUMENTS

CN 102390370 3/2012
CN 202394343 8/2012
(Continued)

OTHER PUBLICATIONS

International Search Report and Written Opinion issued in PCT/US2016/031929 dated Aug. 17, 2016, 12 pages.
(Continued)

*Primary Examiner* — Mohammed Rachedine
(74) *Attorney, Agent, or Firm* — Dority & Manning, P.A.

(57) ABSTRACT

Systems, methods, tangible non-transitory computer-readable media, and devices for operating an autonomous vehicle are provided. For example, the disclosed technology can include receiving sensor data and map data. The sensor data can include information associated with an environment detected by sensors of a vehicle. The map data can include information associated with traffic signals in the environment. Further, an input representation can be generated based on the sensor data and the map data. The input representation can include regions of interest associated with images of the traffic signals. States of the traffic signals in the environment can be determined, based on the input representation and a machine-learned model. Traffic signal state data that includes a determinative state of the traffic signals can be generated based on the states of the traffic signals.

20 Claims, 10 Drawing Sheets

(51) Int. Cl.
*G06K 9/32* (2006.01)
*G06K 9/46* (2006.01)
*G06F 16/29* (2019.01)
*G05D 1/00* (2006.01)

(52) U.S. Cl.
CPC ......... *G06K 9/3241* (2013.01); *G06K 9/6262* (2013.01); *G05D 2201/0213* (2013.01)

(56) References Cited

U.S. PATENT DOCUMENTS

| | | |
|---|---|---|
| 3,899,671 A | 8/1975 | Stover |
| 5,144,685 A | 9/1992 | Nasar et al. |
| 5,635,920 A | 6/1997 | Pogue et al. |
| 5,751,852 A | 5/1998 | Marimont et al. |
| 5,809,179 A | 9/1998 | Marimont et al. |
| 5,864,214 A | 1/1999 | Brodsky |
| 5,940,010 A | 8/1999 | Sasaki et al. |
| 6,023,655 A | 2/2000 | Nomura |
| 6,385,539 B1 | 5/2002 | Wilson et al. |
| 6,542,111 B1 * | 4/2003 | Wilson ................ G01S 13/931 342/70 |
| 6,795,031 B1 | 9/2004 | Walker |
| 7,102,496 B1 | 9/2006 | Ernst |
| 7,124,027 B1 | 10/2006 | Ernst |
| 7,783,403 B2 | 8/2010 | Breed |
| 7,994,465 B1 | 8/2011 | Bamji et al. |
| 8,134,480 B2 | 3/2012 | Onome et al. |
| 8,145,402 B2 | 3/2012 | Craig |
| 8,245,516 B2 | 8/2012 | Anderson |
| 8,253,799 B2 | 8/2012 | Elangovan et al. |
| 8,364,334 B2 | 1/2013 | Au et al. |
| 8,412,449 B2 | 4/2013 | Trepagnier et al. |
| 8,521,352 B1 | 8/2013 | Ferguson |
| 8,527,199 B1 | 9/2013 | Burnette et al. |
| 8,559,673 B2 | 10/2013 | Fairfield et al. |
| 8,676,430 B1 | 3/2014 | Ferguson et al. |
| 8,761,991 B1 | 6/2014 | Ferguson et al. |
| 8,818,043 B2 | 8/2014 | Fairfield et al. |
| 8,825,265 B1 | 9/2014 | Ferguson et al. |
| 8,917,190 B1 | 12/2014 | Melvin |
| 9,036,865 B2 | 5/2015 | Haas et al. |
| 9,045,041 B2 | 6/2015 | Dorum et al. |
| 9,097,800 B1 | 8/2015 | Zhu |
| 9,139,204 B1 | 9/2015 | Zhao et al. |
| 9,140,792 B2 | 9/2015 | Zeng |
| 9,145,140 B2 | 9/2015 | Ferguson et al. |
| 9,158,980 B1 | 10/2015 | Ferguson et al. |
| 9,223,013 B2 | 12/2015 | Stein |
| 9,272,709 B2 | 3/2016 | Salom |
| 9,330,321 B2 | 5/2016 | Schamp |
| 9,383,753 B1 | 7/2016 | Templeton |
| 9,386,230 B1 | 7/2016 | Duran et al. |
| 9,442,487 B1 * | 9/2016 | Ferguson ............. G05D 1/0231 |
| 9,459,625 B1 | 10/2016 | Ferguson et al. |
| 9,488,483 B2 | 11/2016 | Ranganathan et al. |
| 9,494,439 B1 | 11/2016 | Ross et al. |
| 9,507,346 B1 | 11/2016 | Levinson |
| 9,552,564 B1 | 1/2017 | Martenis |
| 9,631,933 B1 | 4/2017 | Aula et al. |
| 9,672,446 B1 | 6/2017 | Vallespi-Gonzalez |
| 9,672,734 B1 | 6/2017 | Ratnasingam |
| 9,683,928 B2 | 6/2017 | Swanson |
| 9,701,239 B2 | 7/2017 | Kentley et al. |
| 9,719,801 B1 | 8/2017 | Ferguson et al. |
| 9,739,881 B1 | 8/2017 | Pavek et al. |
| 9,796,386 B2 | 10/2017 | Ferguson et al. |
| 9,832,241 B1 | 11/2017 | Hayward |
| 9,840,256 B1 | 12/2017 | Valois |
| 9,841,763 B1 | 12/2017 | Valois |
| 9,863,928 B1 | 1/2018 | Peterson |
| 9,902,403 B2 | 2/2018 | Donnelly et al. |
| 9,904,375 B1 | 2/2018 | Donnelly et al. |
| 9,910,439 B1 * | 3/2018 | Ferguson ............. G05D 1/0212 |
| 9,914,458 B2 | 3/2018 | Sato et al. |
| 9,916,703 B2 | 3/2018 | Levinson et al. |
| 9,953,535 B1 | 4/2018 | Canavor et al. |
| 9,990,548 B2 | 6/2018 | Wellington et al. |
| 10,002,156 B2 | 6/2018 | Lublinsky et al. |
| 10,036,639 B1 | 7/2018 | Cox et al. |
| 10,094,672 B2 | 10/2018 | Utsugi et al. |
| 10,726,280 B2 | 7/2020 | Wellington et al. |
| 2002/0109610 A1 | 8/2002 | Katz |
| 2002/0161501 A1 | 10/2002 | Dulin et al. |
| 2003/0001509 A1 | 1/2003 | Leleve |
| 2003/0040944 A1 | 2/2003 | Hileman |
| 2003/0151547 A1 | 8/2003 | Mauro et al. |
| 2004/0085227 A1 | 5/2004 | Mikuriya et al. |
| 2004/0133330 A1 | 7/2004 | Ono et al. |
| 2004/0204812 A1 | 10/2004 | Tran |
| 2005/0010350 A1 | 1/2005 | Hiwatashi |
| 2005/0044944 A1 | 3/2005 | Kogure et al. |
| 2005/0100207 A1 | 5/2005 | Konolige |
| 2005/0113999 A1 | 5/2005 | Tange et al. |
| 2005/0155685 A1 | 7/2005 | Daval |
| 2005/0222744 A1 | 10/2005 | Sakata et al. |
| 2006/0002586 A1 | 1/2006 | Aggarwal |
| 2006/0126975 A1 | 6/2006 | McKellar |
| 2006/0128087 A1 | 6/2006 | Bamji et al. |
| 2006/0208911 A1 | 9/2006 | Davis |
| 2006/0217882 A1 | 9/2006 | Takashima et al. |
| 2006/0223637 A1 | 10/2006 | Rosenberg |
| 2006/0259225 A1 | 11/2006 | Ono et al. |
| 2007/0050121 A1 | 3/2007 | Ammon et al. |
| 2007/0229490 A1 | 10/2007 | Boudreau et al. |
| 2007/0268364 A1 | 11/2007 | Neff et al. |
| 2008/0033645 A1 | 2/2008 | Levinson et al. |
| 2008/0040004 A1 | 2/2008 | Breed |
| 2008/0129475 A1 | 6/2008 | Breed |
| 2008/0162036 A1 | 7/2008 | Breed |
| 2009/0010495 A1 | 1/2009 | Schamp |
| 2009/0043440 A1 | 2/2009 | Matsukawa |
| 2009/0146813 A1 | 6/2009 | Gustavo |
| 2009/0216600 A1 | 8/2009 | Hill |
| 2009/0303077 A1 | 12/2009 | Onome et al. |
| 2010/0165323 A1 | 7/2010 | Fiess |
| 2010/0250056 A1 | 9/2010 | Perkins |
| 2011/0182475 A1 | 7/2011 | Fairfield et al. |
| 2012/0158313 A1 | 6/2012 | Wang |
| 2012/0242492 A1 | 9/2012 | Grunfeld |
| 2012/0288138 A1 | 11/2012 | Zeng |
| 2013/0015984 A1 | 1/2013 | Yamashiro |
| 2013/0253754 A1 | 9/2013 | Ferguson et al. |
| 2013/0314503 A1 | 11/2013 | Nix et al. |
| 2013/0325279 A1 | 12/2013 | Fujimoto et al. |
| 2014/0002277 A1 | 1/2014 | Fulger et al. |
| 2014/0005933 A1 | 1/2014 | Fong et al. |
| 2014/0025232 A1 | 1/2014 | Cuddihy et al. |
| 2014/0046585 A1 | 2/2014 | Morris |
| 2014/0047250 A1 | 2/2014 | Maletsky et al. |
| 2014/0081573 A1 | 3/2014 | Urmson et al. |
| 2014/0118363 A1 | 5/2014 | Hakura et al. |
| 2014/0133330 A1 | 5/2014 | Chapman |
| 2014/0136414 A1 | 5/2014 | Anker |
| 2014/0188363 A1 | 7/2014 | Eckert et al. |
| 2014/0188386 A1 | 7/2014 | Obara |
| 2014/0222298 A1 | 8/2014 | Gurin |
| 2014/0247357 A1 | 9/2014 | Sekiguchi |
| 2014/0302774 A1 | 10/2014 | Burke et al. |
| 2014/0306835 A1 | 10/2014 | Ricci |
| 2014/0307247 A1 | 10/2014 | Zhu et al. |
| 2014/0336842 A1 | 11/2014 | Jang |
| 2014/0336935 A1 | 11/2014 | Zhu et al. |
| 2014/0340304 A1 | 11/2014 | Dewan et al. |
| 2015/0003670 A1 | 1/2015 | Kuehnle |
| 2015/0035985 A1 | 2/2015 | Conneely et al. |
| 2015/0061856 A1 | 3/2015 | Raman et al. |
| 2015/0112585 A1 | 4/2015 | Knepper et al. |
| 2015/0124428 A1 | 5/2015 | Hadrath et al. |
| 2015/0142248 A1 | 5/2015 | Han et al. |
| 2015/0166072 A1 | 6/2015 | Powers et al. |
| 2015/0202770 A1 | 7/2015 | Patron |
| 2015/0203107 A1 | 7/2015 | Lippman |
| 2015/0210274 A1 | 7/2015 | Clark |

(56) References Cited

U.S. PATENT DOCUMENTS

| | | |
|---|---|---|
| 2015/0210277 A1 | 7/2015 | Shalom |
| 2015/0224845 A1 | 8/2015 | Anderson et al. |
| 2015/0247733 A1 | 9/2015 | Horihata |
| 2015/0251659 A1 | 9/2015 | Fischer et al. |
| 2015/0266471 A1 | 9/2015 | Ferguson |
| 2015/0310146 A1 | 10/2015 | Tanzmeister |
| 2015/0331422 A1 | 11/2015 | Hartung |
| 2015/0344038 A1 | 12/2015 | Stenneth et al. |
| 2015/0346727 A1 | 12/2015 | Ramanujam |
| 2015/0362322 A1 | 12/2015 | Ozaki |
| 2015/0369617 A1 | 12/2015 | Ding et al. |
| 2016/0009218 A1 | 1/2016 | Nakashima |
| 2016/0016663 A1 | 1/2016 | Stanek et al. |
| 2016/0054135 A1 | 2/2016 | Fowe |
| 2016/0055744 A1 | 2/2016 | Branson |
| 2016/0125608 A1 | 5/2016 | Sorstedt et al. |
| 2016/0133131 A1 | 5/2016 | Grimm et al. |
| 2016/0161270 A1 | 6/2016 | Okumura |
| 2016/0167582 A1 | 6/2016 | Chen et al. |
| 2016/0171637 A1 | 6/2016 | Rai |
| 2016/0176408 A1 | 6/2016 | Lynch |
| 2016/0178802 A1 | 6/2016 | Stainvas Olshansky et al. |
| 2016/0180171 A1 | 6/2016 | Kamata |
| 2016/0207537 A1 | 7/2016 | Urano |
| 2016/0267720 A1 | 9/2016 | Mandella et al. |
| 2016/0276131 A1 | 9/2016 | Platzgummer |
| 2016/0349063 A1 | 12/2016 | Maurer et al. |
| 2016/0349067 A1 | 12/2016 | Fowe |
| 2016/0357188 A1 | 12/2016 | Ansari |
| 2016/0368504 A1 | 12/2016 | Kieren et al. |
| 2016/0370191 A1 | 12/2016 | Utsugi et al. |
| 2017/0008521 A1 | 1/2017 | Braunstein et al. |
| 2017/0008522 A1 | 1/2017 | Sato et al. |
| 2017/0015317 A1 | 1/2017 | La et al. |
| 2017/0015318 A1 | 1/2017 | Scofield et al. |
| 2017/0016731 A1 | 1/2017 | Koshiba et al. |
| 2017/0017850 A1 | 1/2017 | Oki et al. |
| 2017/0023659 A1 | 1/2017 | Bruemmer et al. |
| 2017/0024622 A1 | 1/2017 | Mizutani et al. |
| 2017/0059336 A1 | 3/2017 | Huang et al. |
| 2017/0084172 A1 | 3/2017 | Rolle et al. |
| 2017/0090478 A1 | 3/2017 | Blayvas et al. |
| 2017/0103274 A1 | 4/2017 | Oki et al. |
| 2017/0103275 A1 | 4/2017 | Yamanoi et al. |
| 2017/0120814 A1 | 5/2017 | Kentley et al. |
| 2017/0123421 A1 | 5/2017 | Kentley et al. |
| 2017/0123429 A1 | 5/2017 | Levinson et al. |
| 2017/0124781 A1 | 5/2017 | Douillard et al. |
| 2017/0126975 A1 | 5/2017 | Duran et al. |
| 2017/0146991 A1 | 5/2017 | Parekh et al. |
| 2017/0168489 A1 | 6/2017 | Rander et al. |
| 2017/0172290 A1 | 6/2017 | Sampaio |
| 2017/0174194 A1 | 6/2017 | Baumgaertner et al. |
| 2017/0193826 A1 | 7/2017 | Marueli et al. |
| 2017/0227647 A1 | 8/2017 | Baik |
| 2017/0229029 A1 | 8/2017 | Klinger et al. |
| 2017/0243073 A1* | 8/2017 | Raghu .............. G06K 9/00818 |
| 2017/0248963 A1 | 8/2017 | Levinson |
| 2017/0255966 A1 | 9/2017 | Khoury |
| 2017/0262709 A1 | 9/2017 | Wellington et al. |
| 2017/0270361 A1 | 9/2017 | Puttagunta et al. |
| 2017/0307763 A1 | 10/2017 | Browning |
| 2017/0309172 A1 | 10/2017 | Linder |
| 2017/0313324 A1 | 11/2017 | Kumai et al. |
| 2017/0315229 A1 | 11/2017 | Pavek et al. |
| 2017/0316333 A1 | 11/2017 | Levinson et al. |
| 2017/0316696 A1 | 11/2017 | Bartel |
| 2017/0345400 A1 | 11/2017 | Li |
| 2017/0351261 A1 | 12/2017 | Levinson |
| 2017/0351984 A1 | 12/2017 | Rasheed et al. |
| 2017/0357669 A1 | 12/2017 | Offenhaeuser et al. |
| 2017/0358204 A1 | 12/2017 | Modica et al. |
| 2018/0003511 A1 | 1/2018 | Browning et al. |
| 2018/0004225 A1 | 1/2018 | Milstein et al. |
| 2018/0004226 A1 | 1/2018 | Milstein et al. |
| 2018/0045519 A1 | 2/2018 | Ghadiok et al. |
| 2018/0060778 A1 | 3/2018 | Guo et al. |
| 2018/0061242 A1 | 3/2018 | Bavar et al. |
| 2018/0143639 A1 | 5/2018 | Singhal et al. |
| 2018/0164119 A1 | 6/2018 | Becker |
| 2018/0189578 A1 | 7/2018 | Yang et al. |
| 2018/0259968 A1* | 9/2018 | Frazzoli .............. G05D 1/0088 |
| 2018/0304891 A1 | 10/2018 | Heidenreich et al. |

FOREIGN PATENT DOCUMENTS

| | | | | |
|---|---|---|---|---|
| CN | 103370249 | | 10/2013 | |
| CN | 104601648 | | 5/2015 | |
| CN | 109711227 | A * | 5/2019 | |
| CN | 109784129 | A * | 5/2019 | |
| CN | 110062871 | A * | 7/2019 | ........... G06F 16/587 |
| CN | 110691957 | A * | 1/2020 | ......... G01C 21/3492 |
| DE | 102014114438 | | 4/2015 | |
| EP | 3032458 | | 6/2016 | |
| JP | H 08334365 | | 3/2005 | |
| JP | 2005-115911 | | 4/2005 | |
| JP | 2006-159939 | | 6/2006 | |
| JP | 2008-027239 | | 2/2008 | |
| JP | 2008-262459 | | 10/2008 | |
| JP | 2009-075756 | | 4/2009 | |
| JP | 2012-127861 | | 7/2012 | |
| JP | 2015-007874 | | 1/2015 | |
| KR | 100862561 | | 10/2008 | |
| RU | 2400592 | | 9/2010 | |
| RU | 132393 | | 9/2013 | |
| WO | WO 2001/065454 | | 9/2001 | |
| WO | WO 2011/038018 | | 3/2011 | |
| WO | WO 2011/055978 | | 5/2011 | |
| WO | WO 2013155661 | | 10/2013 | |
| WO | WO 2014072972 | | 5/2014 | |
| WO | WO 2014108267 | | 7/2014 | |
| WO | WO 2014/147361 | | 9/2014 | |
| WO | WO 2014131400 | | 9/2014 | |

OTHER PUBLICATIONS

International Search Report and Written Opinion issued in PCT/US2016/031929 dated Mar. 27, 2017, 46 pages.

Azim Asma, et al. "Layer-based supervised classification of moving objects in outdoor dynamic environment using 3D laser scanner", 2014 IEEE Intelligent Vehicles Symposium Proceedings, IEEE, Jun. 8, 2014, pp. 1408-1414.

Andres Serna, et al. "Detection, segmentation and classification of 3D urban objects using mathematical morphology and supervised learning", ISPRS Journal of Photogrammetry and Remote Sensing, vol. 93, Jul. 1, 2014, pp. 243-255, Amsterdam, NL.

EESR issued in EP 17169669.3 dated Sep. 13, 2017, 7 pages.

Ansari et al., "Partial Shape Recognition: A Landmark-Based Approach", 1989, IEEE CH2809-2/89/000-0831, 6 pages.

Erjavec et al., "Automotive Technology: A Systems Approach", Feb. 21, 2014, Delmar Cengage Learning, XP055506654, ISBN 978-1-133-61231-5, pp. 616-620, 647-651, 664-668.

Held, "Inter- and Intra- Vehicle Communications", 1st Edition, Nov. 8, 2007, Auerbach Publications, XP055503113, ISBN 978-1-4200-5221-3, Chapter 1, pp. 41-50, Chapter 3, Hrabar et al., "An Evaluation of Stereo and Laser-Based Range Sensing for Rotorcraft Unmanned Aerial Vehicle Obstacle Avoidance", Journal of Field Robotics, vol. 29, No. 2, Oct. 18, 2011, 25 pages.

Hrabar et al., "3D Path Planning and Stereo-Based Obstacle Avoidance for Rotorcraft UAVs" Intelligent Robots and Systems, IEEE International Conference on intelligent Robots and Systems, Sep. 22, 2008, 8 pages.

Ros et al., "Vision-Based Offline-Online Perception Paradigm for Autonomous Driving", IEEE Winter Conference on Applications of Computer Vision, Jan. 5, 2015, 8 pages.

Winner, "Handbuch Fahrerassistanzsystem: Grundlagen, Komponenten und Systeme fur Aktive Sicherheit und Komfort", Apr. 20, 2015, Springer, 132 pages.

(56) References Cited

OTHER PUBLICATIONS

Extended European Search Report for Application No. EP16793475.1 dated Sep. 21, 2018, 14 pages.
Extended European Search Report for Application No. EP17169669.3 dated Sep. 13, 2019, 10 pages.
International Search Report and Written Opinion for Application No. PCT/US2016/066235 dated Mar. 27, 2017, 46 pages.
International Search Report and Written Opinion for Application No. PCT /US2017/046796 dated Feb. 28, 2018, 7 pages.
International Search Report and Written Opinion for Application No. PCT/US2017/056277 dated Apr. 5, 2018, 7 pages.
International Search Report and Written Opinion for Application No. PCT/US2017/040532 dated Jan. 11, 2018, 16 pages.
International Preliminary Report on Patentability for Application No. PCT/US2016/066235 dated Jun. 21, 2018, 42 pages.
Office Action for CN201680040538.2 dated Sep. 10, 2018, 38 pages.
Office Action for CN201710311393.1 dated Nov. 12, 2018, 29 pages.
Office Action for EP 17169669.3, dated Jun. 18, 2018, 7 pages.

\* cited by examiner

TRAFFIC SIGNAL STATE CLASSIFICATION FOR AUTONOMOUS VEHICLES

RELATED APPLICATION

The present application is based on and claims benefit of U.S. Provisional Patent Application No. 62/664,672 having a filing date of Apr. 30, 2018, which is incorporated by reference herein.

FIELD

The present disclosure relates generally to the operation of an autonomous vehicle including detection and recognition of traffic signal states.

BACKGROUND

Vehicles, including autonomous vehicles, can receive data based on the state of the environment around the vehicle including the state of objects in the environment. This data can be used by the autonomous vehicle to perform various functions related to the particular state of those objects. Further, as the vehicle travels through the environment the set of objects in the environment and the state of those objects can also change. As such, the safe operation of an autonomous vehicle in the environment relies on an accurate determination of the state of certain objects in the environment. Accordingly, there exists a need for a computing system that more effectively determines the state of objects in an environment.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method. The computer-implemented method of can include receiving, by a computing system including one or more computing devices, sensor data and map data. The sensor data can include information associated with an environment detected by one or more sensors of a vehicle. The map data can include information associated with one or more traffic signals in the environment. The method can include generating, by the computing system, based at least in part on the sensor data and the map data, an input representation including one or more regions of interest associated with one or more images of the one or more traffic signals. Further, the method can include determining, by the computing system, based at least in part on the input representation and a machine-learned model, the one or more states of the one or more traffic signals in the environment. The method can also include generating, by the computing system, based at least in part on the one or more states of the one or more traffic signals, traffic signal state data including a determinative state of the one or more traffic signals.

Another example aspect of the present disclosure is directed to a state determination system that includes: one or more processors; a machine-learned state determination model trained to receive an input representation based at least in part on sensor data and map data, and, responsive to receiving the input representation, generate traffic signal state data comprising one or more traffic signal states; and a memory comprising one or more computer-readable media, the memory storing computer-readable instructions that when executed by the one or more processors cause the one or more processors to perform operations. The operations can include receiving sensor data and map data. The sensor data can include information associated with an environment detected by one or more sensors of a vehicle. The map data can include information associated with one or more locations of one or more traffic signals in the environment. The operations can include generating, based at least in part on the sensor data and the map data, an input representation comprising one or more regions of interest associated with one or more images of the one or more traffic signals. Further, the operations can include sending, the input representation to the machine-learned state determination model. The operations can also include determining, based at least in part on output from the machine-learned model state determination model, the one or more states of the one or more traffic signals in the environment. Furthermore, the operations can include generating, based at least in part on the one or more states of the one or more traffic signals, traffic signal state data comprising a determinative state of the one or more traffic signals.

Another example aspect of the present disclosure is directed to a computing device including one or more processors and one or more non-transitory computer-readable media storing instructions that when executed by the one or more processors cause the one or more processors to perform operations. The operations can include receiving sensor data and map data. The sensor data can include information associated with an environment detected by one or more sensors of a vehicle. The map data can include information associated with one or more locations of one or more traffic signals in the environment. The operations can include generating, based at least in part on the sensor data and the map data, an input representation including one or more regions of interest associated with one or more images of the one or more traffic signals. Further, the operations can include determining, based at least in part on the input representation and a machine-learned model, the one or more states of the one or more traffic signals in the environment. The operations can also include generating, based at least in part on the one or more states of the one or more traffic signals, traffic signal state data including a determinative state of the one or more traffic signals.

Other example aspects of the present disclosure are directed to other systems, methods, vehicles, apparatuses, tangible non-transitory computer-readable media, and devices for autonomous vehicle operation. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
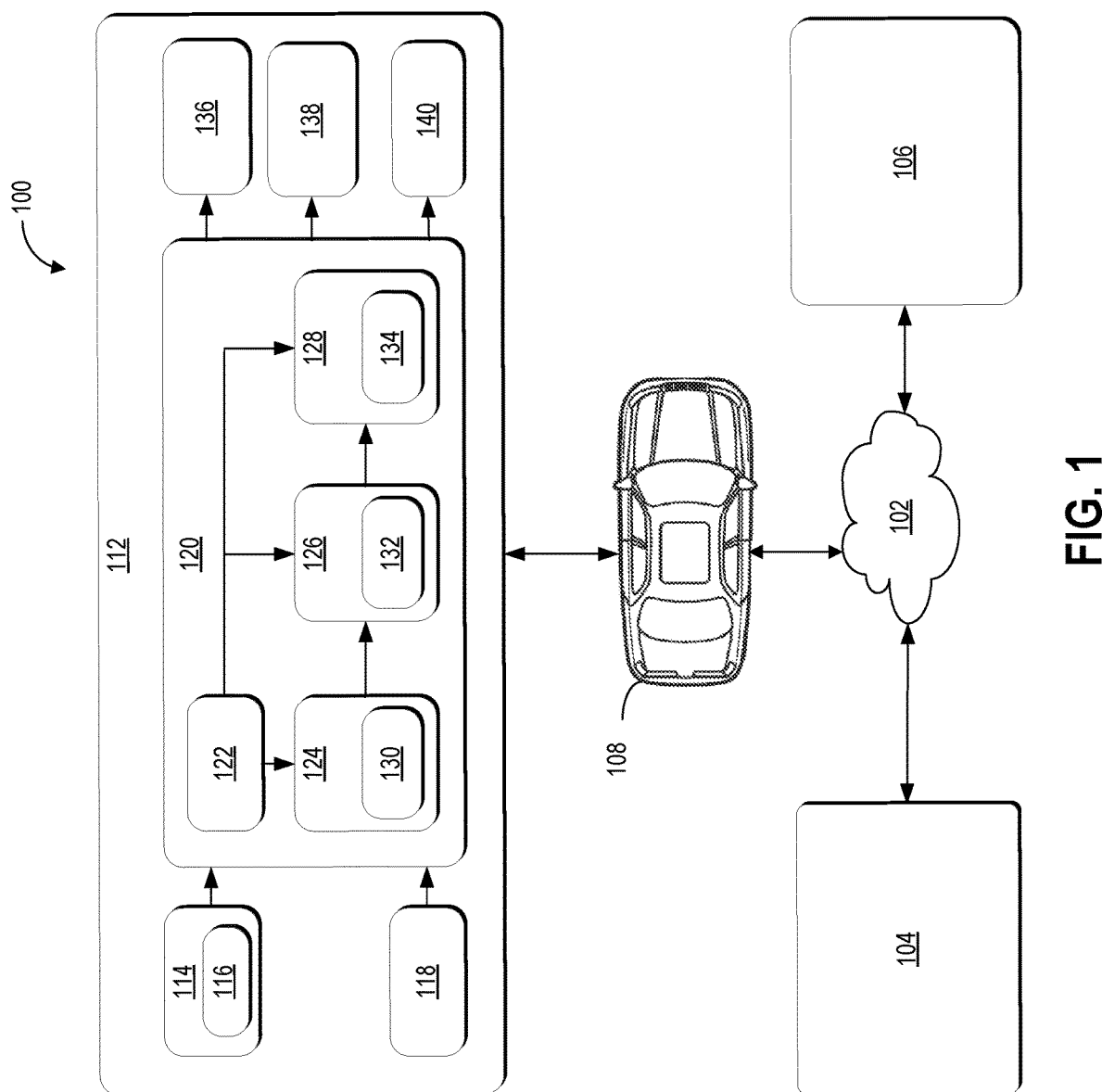
FIG. 1 depicts a diagram of an example system according to example embodiments of the present disclosure.

Example aspects of the present disclosure are directed to determining the state of traffic signals (e.g., traffic lights used to direct the movements of vehicles and/or pedestrians) in an environment proximate (e.g., within a predetermined distance and/or within a sensor field of view) to a vehicle (e.g., an autonomous vehicle, a semi-autonomous vehicle, or a manually operated vehicle), through use of sensor data (e.g., data from one or more light detection and ranging (LIDAR) devices, sonar devices, radar devices, and/or camera devices), map data (e.g., data from one or more geographic map providers), and a machine-learned model (e.g., a machine-learned model trained to detect and determine the state of one or more traffic signals). More particularly, aspects of the present disclosure include receiving sensor data associated with an environment proximate to a vehicle and map data associated with locations of traffic signals in the environment; generating, based in part on the sensor data and the map data, an input representation including one or more regions of interest associated with images (e.g., images including pixels) of the traffic signals; determining, based in part on the input representation and a machine-learned model (e.g., a convolutional neural network), states (e.g., whether a traffic signal is red, green, yellow, or unknown) of the traffic signals; and generating, based on the states of the traffic signals, traffic signal state data including traffic signal indications associated with a determinative state of the traffic signals (e.g., an indication of whether a traffic signal is red, green, yellow, or unknown).

For example, a computing system associated with a vehicle can receive data including sensor data associated with one or more states (e.g., physical dimensions and/or location) of an environment; map data including the locations of traffic signals (e.g., geographic location and/or position relative to the vehicle of the traffic signals). Using the sensor data, the map data, and machine-learned model (e.g., a convolutional neural network trained to detect traffic signals), the computing system can detect the traffic signals and determine the state of the traffic signals that were detected. The computing system can then generate traffic signal state data that includes an indication of the state of the traffic signals (e.g., an indication of the color and shape of a traffic signal). This traffic signal state data can be sent to various vehicle systems to perform operations including stopping the vehicle when a traffic signal indicates the vehicle should stop. Accordingly, the disclosed technology allows for safer and more effective vehicle operation through more rapid, accurate, and precise determination of the state of a traffic signal. Further, through more efficient detection of traffic signals and determination of traffic signal states, the disclosed technology can more efficiently utilize available computational resources.

The vehicle in the disclosed technology can include one or more systems including a vehicle computing system (e.g., a computing system including one or more computing devices with one or more processors and a memory) and/or a vehicle control system that can control a variety of vehicle systems and/or vehicle components. The vehicle computing system can process, generate, and/or exchange (e.g., send or receive) signals or data, including signals or data exchanged with various vehicle systems, vehicle components, other vehicles, or remote computing systems.

For example, the vehicle computing system can exchange one or more signals (e.g., electronic signals) or data with one or more vehicle systems including one or more sensor systems (e.g., sensors that generate output based on detection of changes in the state of the physical environment external to the vehicle, including LIDAR, cameras, microphones, radar devices, thermal sensors, and/or sonar devices); communication systems (e.g., wired and/or wireless communication systems that can exchange signals or data with other devices); navigation systems (e.g., devices that can receive signals from GPS, GLONASS, or other systems used to determine a vehicle's geographical location); notification systems (e.g., devices used to provide notifications to other vehicles and/or pedestrians, including display devices, status indicator lights, and/or audio output devices); braking systems used to slow down the vehicle (e.g., brakes of the vehicle including mechanical and/or electric brakes); propulsion systems used to provide power for the vehicle to move from one location to another (e.g., motors and/or engines including electric engines and/or internal combustion engines); and/or steering systems used to change the path, course, and/or direction of travel of the vehicle.

Further, the vehicle computing system can access a machine-learned model that has been generated and/or trained in part using training data including a plurality of classified features and a plurality of classified object labels. In some embodiments, the plurality of classified features can be extracted from image data that includes a plurality of images associated with one or more sensor outputs from one or more sensors (e.g., one or more cameras) that detect a plurality of training objects (e.g., objects including various traffic signals, vehicles, pedestrians, roads, and/or structures that are used to train the machine-learned model).

When the machine-learned model has been trained, the machine-learned model can associate the plurality of classified features with one or more of the plurality of classified object labels that are used to classify and/or categorize objects including objects that are not included in the plurality of training objects. In some embodiments, as part of the process of training the machine-learned model, the differences in correct classification output between a machine-learned model (that outputs the one or more classified object labels) and a set of classified object labels associated with a plurality of training objects that have previously been correctly identified (e.g., ground truth labels), can be processed using an error loss function that can determine a set of probability distributions based on repeated classification of the same plurality of training objects. As such, the effectiveness (e.g., the rate of correct identification of objects) of the machine-learned model can be improved over time.

The vehicle computing system can access the machine-learned model in various ways including exchanging (sending and/or receiving via a network) data or information associated with a machine-learned model that is stored on a remote computing device; and/or accessing a machine-learned model that is stored locally (e.g., in one or more storage devices of the vehicle).

Furthermore, the plurality of classified features can be associated with one or more values that can be analyzed individually and/or in various combinations. The analysis of the one or more values associated with the plurality of classified features can include determining a mean, mode, median, variance, standard deviation, maximum, minimum, and/or frequency of the one or more values associated with the plurality of classified features. Further, analysis of the one or more values associated with the plurality of classified features can include comparisons of the differences or similarities between the one or more values. For example, the one or more objects associated with a traffic signal can be associated with a range of physical dimensions that are different from the range of physical dimensions associated with a street lamp.

In some embodiments, the plurality of classified features can include a range of physical dimensions associated with the plurality of training objects, a range of colors associated with the plurality of training objects, a range of light intensities (e.g., brightness) associated with the plurality of training objects, and/or a range of shapes associated with the plurality of training objects. The plurality of classified features can be based in part on the output from one or more sensors that have captured a plurality of training objects (e.g., actual objects used to train the machine-learned model) from various angles and/or distances in different environments (e.g., urban areas, suburban areas, rural areas, heavy traffic, and/or light traffic) and/or environmental conditions (e.g., bright daylight, rainy days, darkness, snow covered roads, inside parking structures, in tunnels, and/or under streetlights). The one or more classified object labels can then be used to classify and/or categorize the one or more objects, including one or more traffic signals, buildings, roads, city streets, highways, sidewalks, bridges, overpasses, waterways, pedestrians, cyclists, automobiles, trucks, trees, foliage, and/or natural geographic formations.

In some embodiments, the vehicle computing system can include: one or more processors; a machine-learned state determination model trained to receive an input representation based at least in part on sensor data and map data, and, responsive to receiving the input representation, generate output including one or more states of one or more traffic signals; and a memory including one or more computer-readable media, the memory storing computer-readable instructions that when executed by the one or more processors cause the one or more processors to perform operations. The operations performed by the vehicle computing system can include receiving sensor data and map data. The sensor data can include information associated with an environment detected by one or more sensors of a vehicle. The map data can include information associated with one or more locations of one or more traffic signals in the environment. An input representation can be generated based on the sensor data and the map data. The input representation can be sent to the machine-learned state determination model, which can process the input representation and generate output including one or more states of one or more traffic signals. Furthermore, in some embodiments, the machine-learned model can include a convolutional neural network (CNN), a recurrent neural network, or a recursive neural network.

In some embodiments, the machine-learned model can be trained based at least in part on a plurality of training images comprising one or more shapes (e.g., circles, arrows, and/or straight lines). The plurality of training images can be associated with a plurality of features and a plurality of shape labels corresponding to the one or more shapes within the plurality of training images. Further, the plurality of shape labels can be independent of a location of the one or more shapes within each of the plurality of training images.

The vehicle computing system can receive sensor data and map data. The sensor data can include information based at least in part on one or more sensor outputs associated with detection of an environment (e.g., the condition of the environment including the location, position, color, and/or brightness of one or more objects in the environment) by one or more sensors of a vehicle. The environment can include one or more objects including one or more traffic signals (e.g., traffic signals used to direct the movements of vehicles, cyclists, and/or pedestrians), one or more vehicles, one or more pedestrians, one or more cyclists, one or more roads, one or more utility structures, one or more buildings, one or more trees, foliage, and/or one or more natural geographic formations. Further, the one or more sensor outputs can be associated with one or more physical properties and/or attributes of the one or more objects. The one or more sensor outputs can be associated with the shape (e.g., circular, square, rectangular, arrow shaped, vertical line, horizontal line, diagonal line, and/or cross shaped), color (e.g., red, green, yellow, amber, orange, white, and/or black), position (e.g., the position of an object relative to the vehicle), orientation (e.g., bearing), texture, velocity, acceleration, and/or physical dimensions (e.g., width, depth, and/or height) of the one or more objects and/or portions of the one or more objects (e.g., a front portion of the one or more objects that is facing the front of the vehicle).

The map data can include information associated with one or more locations of the one or more traffic signals in the environment. Further, the map data can include: the one or more geographic locations of the one or more traffic signals (e.g., latitude and longitude of the one or more traffic signals); the position of the one or more traffic signals relative to the vehicle (e.g., the orientation of the one or more traffic signals with respect to the vehicle, the height of the one or more traffic signals, the distance of the traffic signals from the vehicle, and/or the angle of the one or more traffic signals with respect to the vehicle); the one or more states associated with each of the one or more traffic signals (e.g., whether the one or more traffic signals include turn signals or flashing signals); and/or the operational state of the one or more traffic signals (e.g., whether the one or more traffic signals are operating properly or malfunctioning).

Furthermore, the map data can provide information associated with the environment surrounding the vehicle. For example, map data can include: the identity and/or location of different travel-ways (e.g., roadways), road segments, buildings, and/or other items or objects (e.g., lampposts, crosswalks, and/or curbs); the location and directions of traffic lanes (e.g., the location and direction of a parking lane, a turning lane, a bicycle lane, or other lanes within a particular roadway or other travel-way); traffic control data (e.g., the location and instructions of signage, traffic lights, or other traffic control devices); and/or any other map data that provides information that can be used by the vehicle computing system to process and/or determine the state of the environment surrounding the vehicle.

In some embodiments, the one or more sensors can include one or more cameras (e.g., an optical device that can capture still and/or moving images including capturing images through exposure to light in the visible light spectrum, infrared light spectrum, and/or ultraviolet light spectrum) and/or one or more thermal sensors (e.g., a sensor that can detect the heat of one or more objects). Furthermore, the one or more cameras can include one or more wide field of view cameras (e.g., one or more cameras that can capture a horizontal and/or vertical field of view within a predetermined field of view range) and/or one or more narrow field of view cameras (e.g., one or more cameras that can capture a horizontal and/or vertical field of view within a predetermined narrow field of view range). By way of example only, the one or more wide field of view cameras can have a field of view of ninety degrees (90°) and the one or more narrow field of view cameras can have a field of view of thirty degrees (30°).

The vehicle computing system can generate, based at least in part on the sensor data and the map data, an input representation (e.g., data that includes a representation of the sensor data that can be used as an input for a machine-learned state determination model). The input representation can include one or more regions of interest (e.g., regions associated with the sensor data or the map data that are more likely to include information that can be used to determine the state of the one or more traffic signals) associated with one or more images (e.g., images including a plurality of pixels) of the one or more traffic signals in the environment. For example, the input representation can include one or more data structures that are used to represent the one or more traffic signals in the environment. By way of further example, the input representation can include color space information (e.g., luminance, chrominance, saturation, and/or hue) for a plurality of pixels in the one or more images of the sensor data. Further, the input representation can include shape information associated with the shape of objects within the region of interest (e.g., circular, square, arrow-shaped, horizontal line, diagonal line, vertical line, and/or cross-shaped).

In some embodiments, the one or more regions of interest can correspond to one or more faces (e.g., the one or more faces of a traffic signal device) of the one or more traffic signals and include one or more sections associated with a corresponding signaling component of the one or more traffic signals (e.g., the light bulb or light emitting diode components of the one or more traffic signals); one or more subsets including the one or more sections that control the same direction of travel in one face of the one or more faces; and/or a set including the one or more sections that control the same direction of travel across any of the one or more faces. Furthermore, the one or more regions of interest can be part of an approach that includes the one or more regions of interest ordered chronologically (e.g., the approach includes one or more regions of interest starting with the least recent region of interest for a face and ending with the most recent region of interest for a face).

In some embodiments, generating, based at least in part on the sensor data and the map data, an input representation including one or more regions of interest associated with one or more images of the one or more traffic signals can include modifying the one or more regions of interest in the one or more images to be the same size. For example, the vehicle computing system can resize the one or more regions of interest so that the one or more regions of interest have the same dimensions within the one or more images (e.g., in a square image including a plurality of pixels, the one or more regions of interest would have the same number of horizontal and vertical pixels).

In some embodiments, generating, based at least in part on the sensor data and the map data, an input representation including one or more regions of interest associated with one or more images of the one or more traffic signals can include determining a position (e.g., a location of the vehicle with respect to the one or more traffic signals) of the vehicle relative to the one or more traffic signals. For example, the input representation can include information associated with the position of the one or more traffic signals and the vehicle that can be used by the vehicle computing system to determine the relative position of the vehicle with respect to the one or more traffic signals.

Further, the vehicle computing system can transform the one or more regions of interest in the one or more images to be the same shape based at least in part on the position of the vehicle relative to the one or more traffic signals. For example, the one or more regions of interest can include one or more traffic signals that, due to the angle of the vehicle with respect to the one or more traffic signals, appear to be oval shaped. The vehicle computing system can use the information about the angle of the one or more traffic signals to transform the oval shaped traffic signals into circular traffic signals.

In some embodiments, generating, based at least in part on the sensor data and the map data, an input representation including one or more regions of interest associated with one or more images of the one or more traffic signals can include adjusting one or more properties (e.g., one or more visual properties) of the one or more images. Adjusting the one or more properties of the one or more images can includes underexposing the one or more images; modifying a light intensity associated with the one or more images (e.g., increasing the luminance or gamma of the one or more images); modifying a hue associated with the one or more images; and/or modifying a saturation associated with the one or more images (e.g., increasing the saturation).

Furthermore, in some implementations, adjusting one or more properties of the one or more images can include converting image data from the one or more images into one or more multi-parameter representations. One example multi-parameter image representation can correspond to an HSG representation corresponding to distinct values for an image hue (H) parameter, an image saturation (S) parameter, and an image greyscale (G) parameter. The image hue (H) parameter can be representative of the light property for image data that characterizes how color is classified as one of multiple color parameters (e.g., red, green, blue, white, and/or yellow) relative to one or more respective pure reference values for each color parameter in the color spectrum. The image saturation (S) parameter can be representative of the light property for image data that characterizes the intensity of color within the image relative to brightness. The image greyscale (G) parameter can be representative of the light property for image data that characterizes the intensity of monochrome light for each pixel within an image. The use of multi-parameter HSG representations for image data can provide an enhanced image data format that has proven to be beneficial for image-based object detection applications. These benefits can be achieved in part by the type of image information captured using the hue, saturation and greyscale parameters.

Another example multi-parameter image representation can correspond to an LUV representation corresponding to distinct values for an image luminance (L) parameter, an image red/green chrominance (U) parameter, and an image blue/yellow chrominance (V) parameter. The image luminance (L) parameter can be representative of the light property for image data that characterizes the intensity or brightness of light within each pixel in an image. The image red/green chrominance (U) parameter can be representative of the light property for image data that characterizes the red and/or green color components in each pixel in an image. The image blue/yellow chrominance (V) parameter can be representative of the light property for image data that characterizes the blue and/or yellow color components in each pixel in an image.

The vehicle computing system can determine, based at least in part on the input representation and a machine-learned model, the one or more states of the one or more traffic signals in the environment. For example, the vehicle computing system can provide the information in the input representation (e.g., one or more representations of image data associated with one or more traffic signals) as an input to the machine-learned model, which can determine that the one or more traffic signals include a green state (e.g., a traffic light in the one or more traffic signals is illuminated with a green light to indicate that the vehicle can proceed).

In some embodiments, the one or more states of the one or more traffic signals can include an on state (e.g., a traffic light of the one or more traffic signals are illuminated) associated with a traffic signal being active; an off state (e.g., a traffic light of the one or more traffic signals is not illuminated) associated with a traffic signal being inactive; a green state indicating the vehicle can proceed; a red state indicating the vehicle should stop (e.g., stop at an intersection or crosswalk until the one or more traffic signals change to a state that is not the red state); a yellow (e.g., amber or orange) state indicating the vehicle can proceed with caution; a flashing state to modify what another state of the one or more states of the one or more traffic signals is indicating (e.g., a flashing red state in which the traffic signal alternates between the red state and the off state can indicate that the vehicle should stop before proceeding instead of just stopping as indicated by the red state that is not flashing); a straight arrow state to indicate the vehicle can proceed straight ahead; a left turn state to indicate that the vehicle can turn left (e.g., turn left at an intersection); a right turn state to indicate that the vehicle can turn right (e.g., turn right at an intersection); a pedestrian walking state to indicate a pedestrian can cross a road; a pedestrian stopping state to indicate that a pedestrian should not cross a road; an unknown state indicating that a state cannot be determined with a confidence greater than a predetermined threshold value; and/or a conflicting state indicating that a difference between two most likely states is less than a predetermined threshold value.

Furthermore, in some embodiments, confidence scores (e.g., a confidence score indicating the likelihood that the state of a respective section has been accurately determined) can be determined for all sections in a subset. The confidence scores for each of the sections can then be used to determine a confidence score for a set. By way of example, when the determined state of a section is that the green circle is illuminated, this state can be associated with a confidence score (e.g., a confidence score of 90%) descriptive of a likelihood that the state has been accurately determined.

In some embodiments, determining, based at least in part on the input representation and the machine-learned model, the one or more states of the one or more traffic signals in the environment can include determining, based at least in part on the sensor data, that the state of a section of the one or more sections is the flashing state when a brightness of the section alternates between being below a brightness threshold and exceeding the brightness threshold a predetermined number of times within a predetermined time period. For example, the vehicle computing system can determine that a section of the one or more sections is flashing when a section alternates between being above a brightness threshold and below the brightness threshold once per second.

In some embodiments, determining, based at least in part on the input representation and the machine-learned model, the one or more states of the one or more traffic signals in the environment can include determining, based at least in part on the sensor data, one or more differences in the one or more states of the one or more traffic signals over a plurality of time intervals. Further, the vehicle computing system can determine that the one or more states of the one or more traffic signals are invalid when the one or more differences in the one or more states of the one or more traffic signals over the plurality of time intervals satisfy one or more invalid state change criteria. For example, the vehicle computing system can determine that the state of the one or more traffic signals changing from the red state to the yellow state is invalid.

The one or more invalid state change criteria can include two or more conflicting states of the one or more traffic signals occurring simultaneously or an invalid transition of the one or more states over successive time intervals of the plurality of time intervals.

In some embodiments, determining, based at least in part on the input representation and the machine-learned model, the one or more states of the one or more traffic signals in the environment can include pooling the one or more images. Pooling (e.g., down-sampling) of the one or more images can include average pooling or max pooling.

The vehicle computing system can generate, based at least in part on the one or more states of the one or more traffic signals, traffic signal state data associated with the one or more states of the one or more traffic signals. The traffic signal state data can be to activate and/or initiate the performance of one or more operations and/or actions by one or more vehicle systems and/or one or more vehicle components. Further, the traffic signal state data can include a determinative state of the one or more states of the one or more traffic signals. The determinative state can be the state of the one or more traffic signals that the vehicle computing system will use to determine an action to perform (e.g., stopping the vehicle when the determinative state is the red state).

Further, in some embodiments, the traffic signal state data can include one or more indications associated with the determinative state of the one or more traffic signals. For example, the vehicle computing system can generate traffic signal state data indicating that the determinative state is a red state (e.g., the traffic signal indicates that the vehicle should stop at an intersection in front of the one or more traffic signals). The traffic signal state data can be sent to a vehicle system associated with directing the course of the vehicle so that the vehicle can be brought to a stop at the intersection.

In some embodiments, generating, based at least in part on the one or more states of the one or more traffic signals, the traffic signal state data comprising a determinative state of the one or more traffic signals can include determining that the determinative state of the one or more traffic signals is the red state when a majority of the one or more regions of interest is at least partly occluded (e.g., blocked or obstructed). For example, the vehicle computing system can determine when the one or more traffic signals include three traffic signals, two of which are occluded by tree branches, that the state of the one or more traffic signals is the red state.

In some embodiments, generating, based at least in part on the one or more states of the one or more traffic signals, the traffic signal state data comprising a determinative state of the one or more traffic signals can include determining, the one or more states corresponding to the one or more sections in the one or more subsets. Further, in response to none of the one or more sections being in the red state and a majority of the one or more sections having the same state, the vehicle computing system can determine the determinative state of the one or more traffic signals based at least in part on the one or more states of the majority of the one or more sections in the one or more subsets. For example, if the vehicle computing system determines that none of the one or more sections is in the red state (e.g., none of the lights on the one or more traffic signals are red) and that two of three subsets in the red section and yellow section are in the off state, then the determinative state can be the green state since a majority (two of three) are indicative of the determinative state being the green state.

In some embodiments, generating, based at least in part on the one or more states of the one or more traffic signals, the traffic signal state data comprising a determinative state of the one or more traffic signals can include determining that the state of the one or more traffic signals is the red state when the one or more sections in either of the one or more subsets or the one or more sets do not indicate the same direction of travel. For example, when the one or more sections (e.g., the lights associated with the one or more traffic signals) of the one or more subsets indicate a combination of left turns and right turns, the vehicle computing system can determine that the state of the one or more traffic signals is the red state.

The vehicle computing system can activate, based at least in part on the traffic signal state data, one or more vehicle systems associated with operation of the vehicle. For example, the vehicle computing system can transmit one or more signals including the traffic signal state data to one or more vehicle systems. The one or more signals transmitted (e.g., transmitted via wired and/or wireless connections) by the vehicle computing system can cause the one or more vehicle systems to perform one or more operations including activating: one or more communication systems that can exchange (send and/or receive) signals or data with other vehicle systems, other vehicles, or remote computing devices; one or more lighting systems (e.g., one or more headlights, hazard lights, and/or vehicle compartment lights); one or more vehicle safety systems (e.g., one or more collision avoidance systems); one or more notification systems that can generate one or more notifications for passengers of the vehicle (e.g., auditory and/or visual messages about the state or predicted state of the vehicle); braking systems (e.g., stopping the vehicle when a red traffic signal state is detected); propulsion systems (e.g., changing the amount of power that is output from engines and/or motors of the vehicle) that can be used to change the acceleration and/or velocity of the vehicle; and/or steering systems that can change the path, course, and/or direction of travel of the vehicle.

The systems, methods, devices, and non-transitory computer-readable media in the disclosed technology can provide a variety of technical effects and benefits to the overall operation of the vehicle and the detection and recognition of traffic signals and traffic signal states in particular. The disclosed technology can more effectively detect traffic signals and determine the state of the traffic signals through use of a machine-learned model that facilitates rapid and accurate detection and/or recognition of objects. Further, use of a machine-learned model to detect and determine the state of traffic signals allows for more effective performance in comparison to other approaches including rules-based determination systems.

The disclosed technology provides improvements over existing systems by employing innovative approaches (e.g., determining traffic signal state based on a majority of determined traffic signal states) to solving the challenges of translational variance (e.g., off center regions of interest), scale variance (e.g., differences in the size of traffic signals in images), and dataset imbalances resulting from the preponderance of certain training inputs (e.g., red circles and green circles) in comparison to other training inputs (e.g., left turn arrows). Further, the disclosed technology can leverage map data as a way of determining regions of interest for traffic signals, thereby improving the accuracy of traffic signal state determination.

Example systems in accordance with the disclosed technology can achieve a significant reduction in the number of detection outliers (e.g., the number of times in which the difference between predicted class and actual class exceeds a class threshold value). Furthermore, the machine-learned model can be more readily adjusted (e.g., via retraining on a new and/or modified set of training data) than a rules-based system (e.g., via burdensome, manual re-writing of a set of rules) as the vehicle computing system can be periodically updated to be able to better calculate the nuances of object properties and/or attributes (e.g., physical dimensions, colors, and/or brightness). This can allow for more efficient adjustment of the vehicle computing system in response to different environments and conditions.

The systems, methods, devices, and non-transitory computer-readable media in the disclosed technology have an additional technical effect and benefit of improved scalability by using a machine-learned model to determine object properties and/or attributes including position, shape, and/or color. In particular, modeling object properties and/or attributes through machine-learned models can greatly reduce the research time needed relative to development of hand-crafted object position, shape, and/or color determination rules.

For example, for manually created (e.g., rules conceived and written by one or more people) object detection rules, a rule designer may need to derive heuristic models of how different objects may exhibit different properties and/or attributes in different scenarios. Further, it can be difficult to manually create rules that effectively address all possible scenarios that a vehicle (e.g., an autonomous vehicle) may encounter relative to vehicles and other detected objects. By contrast, the disclosed technology, through use of machine-learned models, can train a model on training data, which can be done at a scale proportional to the available resources of the training system (e.g., a massive scale of training data can be used to train the machine-learned model). Further, the machine-learned models can easily be revised as new training data is made available. As such, use of a machine-learned model trained on labeled sensor data can provide a scalable and customizable solution.

As such, the superior determinations of object properties and/or attributes (e.g., positions, shapes, and/or colors) can increase the safety of passengers of the vehicle, pedestrians, and other vehicles. Further, the disclosed technology can achieve improved fuel economy by requiring less sudden braking and other energy inefficient maneuvers caused by inaccurate or imprecise detection of traffic signals or incorrect determination of the state of the traffic signals. Additionally, the disclosed technology can result in more efficient utilization of computational resources due to the improvements in processing sensor outputs (e.g., detected traffic signals) that come through use of a machine-learned model (e.g., a convolutional neural network).

The disclosed technology can also improve the operational performance and safety of the vehicle by reducing the amount of wear and tear on vehicle components through more gradual braking based on earlier and more accurate detection of traffic signals and traffic signal states. For example, more effective detection of traffic signals and determination of traffic signal states by the vehicle computing system can allow for a smoother ride that reduces the amount of strain on the vehicle's engine, braking, and/or steering systems, thereby improving vehicle performance and safety.

Accordingly, the disclosed technology provides more accurate determination of the state of traffic signals detected by sensors of a vehicle. Operational benefits of the disclosed technology include enhanced vehicle safety resulting from improved traffic signal detection and recognition of the state of the traffic signals. Further operational benefits include reduced wear and tear on vehicle components resulting from earlier and more accurate detection of traffic signals.

With reference now to FIGS. 1-10, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communications system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. Further, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of a vehicle including receiving map data and sensor data (e.g., sensor data from one or more sensors of the vehicle 108); generating an input representation based on the map data and sensor data; determining one or more states of one or more traffic signals, based on the input representation; and/or generating traffic signal data based on the states of the one or more traffic signals.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108. The vehicle status data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle).

The operations computing system 104 can communicate with the one or more remote computing devices 106 and/or the vehicle 108 via one or more communications networks including the communications network 102. The communications network 102 can exchange (send and/or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies).

For example, the communications network 102 can include a local area network (e.g. intranet), wide area network (e.g. Internet), wireless Local area network (LAN) network (e.g., via Wi-Fi), cellular network, a SATCOM network, Very high frequency (VHF) network, a high frequency (HF) network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and/or the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a truck, and/or a bus), an aircraft (e.g., an airplane and/or helicopter), a water craft (e.g., a boat, catamaran, submersible, and/or submarine), amphibious vehicle (e.g., hovercraft), and/or another type of vehicle. The vehicle 108 can be an autonomous vehicle that can perform various operations and/or actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can operate (e.g., drive and/or navigate the vehicle 108) with no interaction from a human driver including a human driver present in the vehicle 108 or a human driver remote (e.g., a tele-operator) from the vehicle 108. A semi-autonomous operational mode can be one in which the vehicle 108 can operate with some interaction from a human driver including a human driver present in the vehicle 108 or remote (e.g., a tele-operator) from the vehicle 108. Park and/or sleep modes can be used between operational modes while the vehicle 108 performs various operations and/or actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., physical dimensions, velocity, acceleration, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. Further, the vehicle computing system 112 can send and/or receive one or more signals and/or data to or from one or more vehicle systems, vehicle components, and/or remote computing devices. The one or more computing devices of the vehicle computing system 112 can include various components for performing various operations and functions. For instance, the one or more computing devices of the vehicle computing system 112 can include one or more processors and one or more memory devices (e.g., memory devices including tangible non-transitory computer-readable media). The one or more processors of the vehicle computing system 112 can include any processing device (e.g., a processor core, a microprocessor, an ASIC, a FPGA, a GPU, a controller, and/or a microcontroller) and can include one processor or a plurality of processors that are operatively connected. The one or more memory devices of the vehicle computing system 112 can include one or more non-transitory computer-readable storage mediums, including RAM, ROM, EEPROM, EPROM, solid state memory devices (e.g., flash memory devices), optical memory devices, and/or magnetic disks.

The one or more memory devices of the vehicle computing system 112 can store instructions that when executed by the one or more processors of the vehicle computing system 112 cause the vehicle 108 (e.g., its computing system, one or more processors, and/or other devices in the vehicle 108) to perform one or more operations. The one or more operations performed by the vehicle computing system 112 can include receiving sensor data and map data (e.g., sensor data including information associated with an environment detected by one or more sensors of a vehicle and the map data including information associated with one or more locations of one or more traffic signals in the environment); generating, based at least in part on the sensor data and the map data, an input representation including one or more regions of interest associated with one or more images of the one or more traffic signals; sending the input representation to the machine-learned state determination model; determining, based at least in part on output from the machine-learned model state determination model, the one or more states of the one or more traffic signals in the environment; and generating, based at least in part on the one or more states of the one or more traffic signals, traffic signal state data comprising a determinative state of the one or more traffic signals.

As depicted in FIG. 1, the vehicle computing system 112 can include the one or more sensors 114; the positioning system 118; the autonomy computing system 120; the communications system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of the one or more sensors 114). The sensor data 116 can include information associated with an environment detected by one or more sensors 114 of a vehicle (e.g., vehicle 108). The one or more sensors 114 can include a LIDAR system, a Radio Detection and Ranging (RADAR) system, one or more cameras (e.g., visible spectrum cameras and/or infrared cameras), one or more thermal sensors, one or more motion sensors, one or more sound sensors (e.g., one or more microphones), one or more tactile sensors, one or more capacitive sensors, and/or other types of imaging capture devices and/or sensors. The sensor data 116 can include image data (e.g., wide field of view image data and/or narrow field of view image data), radar data, LIDAR data, and/or other data acquired by the one or more sensors 114.

When sensors 114 include one or more cameras (e.g., an optical device that can capture still and/or moving images including capturing images through exposure to light in the visible light spectrum, infrared light spectrum, and/or ultraviolet light spectrum), such cameras can include one or more wide field of view cameras (e.g., one or more cameras that can capture a horizontal and/or vertical field of view within a predetermined field of view range) and/or one or more narrow field of view cameras (e.g., one or more cameras that can capture a horizontal and/or vertical field of view within a predetermined narrow field of view range). In some embodiments, the one or more wide field of view cameras can have a field of view in the range of 80-120 degrees (e.g., about ninety degrees (90°)). In some embodiments, the one or more narrow field of view cameras can have a field of view in the range of 20-50 degrees (e.g., thirty degrees (30°)).

The one or more objects (e.g., the one or more objects detected by the one or more sensors 114) can include, for example, traffic signals, buildings, roads, road markings, road signs, foliage, pedestrians, vehicles, cyclists, and/or other objects. The one or more objects can be located at various parts of the environment including above the vehicle, below the vehicle, to the left of the vehicle, to the right of the vehicle, and behind the vehicle. The sensor data 116 can be indicative of the state of the one or more objects within the surrounding environment of the vehicle 108 at one or more times. For example, sensor data 116 can be indicative of one or more visual images associated with the one or more objects within the surrounding environment (e.g., images of traffic signals that can be used to determine the color, size, and shape of the traffic signals). The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity (e.g., the class) and location of different traffic signals, roadways, road segments, buildings, or other items or objects (e.g., lampposts, crosswalks and/or curbs); the location and directions of traffic signals, traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The map data 122 can also more particularly include information associated with one or more traffic signals in the environment. For example, the map data 122 can include information associated with one or more locations of one or more traffic signals in the environment associated with a vehicle (e.g., vehicle 108). In addition, map data 122 can include: the one or more geographic locations of the one or more traffic signals (e.g., latitude and longitude of the one or more traffic signals); the position of the one or more traffic signals relative to the vehicle (e.g., the orientation of the one or more traffic signals with respect to the vehicle, the height of the one or more traffic signals, the distance of the traffic signals from the vehicle, and/or the angle of the one or more traffic signals with respect to the vehicle); the one or more states associated with each of the one or more traffic signals (e.g., whether the one or more traffic signals include turn signals or flashing signals); and/or the operational state of the one or more traffic signals (e.g., whether the one or more traffic signals are operating properly or malfunctioning).

The vehicle computing system 112 can include a positioning system 118. The positioning system 118 can determine a current position of the vehicle 108. The positioning system 118 can include any device and/or circuitry for analyzing the position of the vehicle 108. For example, the positioning system 118 can determine position (e.g., the position of the vehicle 108) by using one or more inertial sensors, a satellite positioning system, based on IP/MAC address, by using triangulation and/or proximity to network access points or other network components (e.g., cellular towers and/or Wi-Fi access points), and/or other suitable techniques.

The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 with relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that interact and/or cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class, building class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) of an object can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., driving past an object) without increasing the potential risk to the vehicle 108 and/or violating any traffic laws (e.g., speed limits, lane boundaries, movement restrictions indicated by signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control system(s) 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees ("X" representing a number of degrees) and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat).

Figure 2:
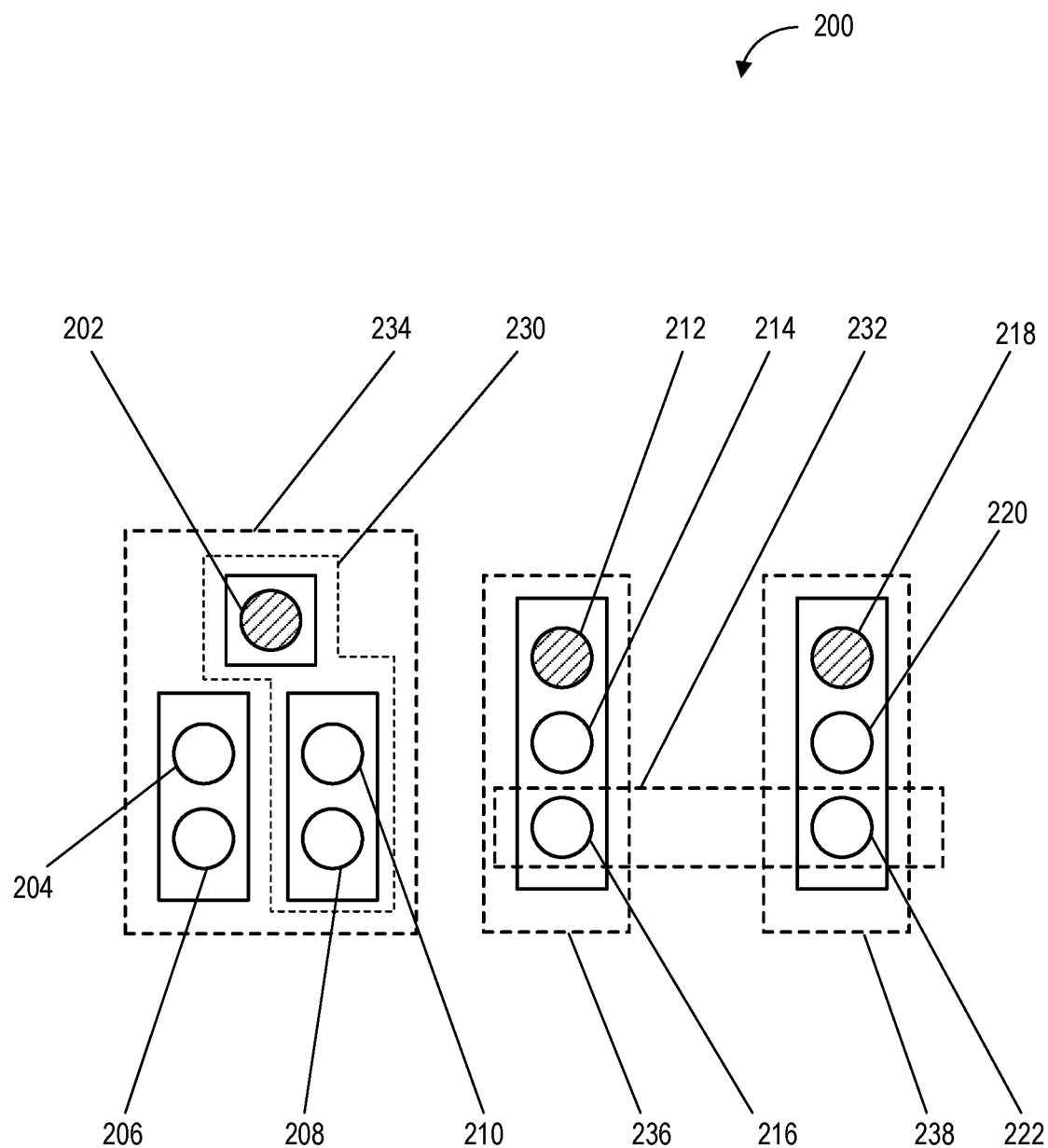
FIG. 2 depicts an example of traffic signal devices according to example embodiments of the present disclosure.

FIG. 2 depicts an example of traffic signal devices according to example embodiments of the present disclosure. One or more states, actions, and/or events associated with the devices depicted in FIG. 2 can be performed and/or implemented by one or more devices (e.g., one or more computing devices) or systems (e.g., one or more computing systems) including, for example, the operations computing system 104, the vehicle 108, and/or the vehicle computing system 112, shown in FIG. 1.

As illustrated, FIG. 2 shows a group of traffic signals 200 that includes a section 202, a section 204, a section 206, a section 208, a section 210, a section 212, a section 214, a section 216, a section 218, a section 220, a section 222, a subset 230, a set 232, a face 234, a face 236, and a face 238.

Each of the sections 202-222 can be associated with a corresponding signaling component of the group of traffic signals 200. More particularly, each of the sections 202-222 can correspond to a light bulb or light emitting diode components of the group of traffic signals 200. A subset (e.g., subset 230) in the group of traffic signals 200 includes the one or more sections (e.g., sections 202, 208, and 210) that control the same direction of travel in one face (e.g., face 234) of the one or more faces (e.g., faces 234-238). A set (e.g., set 232) in the group of traffic signals 200 includes the one or more sections (e.g., sections 216 and 222) that control the same direction of travel across any of the one or more faces (e.g., faces 236 and 238).

The section 202, the section 212, and/or the section 218 can include a section of a traffic signal device that is used to indicate different states using a color and/or shape. The colors of the section 202, the section 212, and/or the section 218 can include a red state to indicate that the movement of traffic (e.g., the movement of vehicle's and/or pedestrians) in the direction controlled by the section 202, the section 212, and/or the section 218 (e.g., the straight ahead direction when the section 202 is round and the direction of an arrow when the section 202 is an arrow) should stop until the section 202, the section 212, and/or the section 218 changes to a non-red state. Further, the section 202, the section 212, and/or the section 218 can be in the form of various shapes including circular, square, rectangular, triangular, an arrow (e.g., a straight ahead arrow, a left-turn arrow, or a right-turn arrow), cross-shaped (e.g., a plus sign), or x-shaped.

The section 204, the section 210, the section 214, and/or the section 220 can include a section of a traffic signal device that is used to indicate different states using a color and/or shape. The colors of the section 204, the section 210, the section 214, and/or the section 220 can include a yellow state (e.g., an amber state or orange state) to indicate that the movement of traffic (e.g., the movement of vehicle's and/or pedestrians) in the direction controlled by the section 204, the section 210, the section 214, and/or the section 220 (e.g., the straight ahead direction when the section 204 is round and the direction of an arrow when the section 204 is an arrow) can proceed with caution (e.g., a vehicle may proceed along a travel path at a reduced velocity) until the section 204, the section 210, the section 214, and/or the section 220 changes to a non-yellow state. Further, the section 204, the section 210, the section 214, and/or the section 220 can be in the form of various shapes including circular, square, rectangular, triangular, an arrow (e.g., a straight ahead arrow, a left-turn arrow, or a right-turn arrow), cross-shaped (e.g., a plus sign), or x-shaped.

The section 206, the section 208, the section 216, and/or the section 222 can include a section of a traffic signal device that is used to indicate different states using a color and/or shape. The colors of the section 206, the section 208, the section 216, and/or the section 222 can include a green state to indicate that the movement of traffic (e.g., the movement of vehicle's and/or pedestrians) in the direction controlled by the section 206, the section 208, the section 216, and/or the section 222 (e.g., the straight ahead direction when the section 206 is round and the direction of an arrow when the section 206 is an arrow) can safely proceed until the section 206, the section 208, the section 216, and/or the section 222 changes to a non-green state. Further, the section 206, the section 208, the section 216, and/or the section 222 can be in the form of various shapes including circular, square, rectangular, triangular, an arrow (e.g., a straight ahead arrow, a left-turn arrow, or a right-turn arrow), cross-shaped (e.g., a plus sign), or x-shaped.

The subset 230 can include the section 202, the section 208, and the section 210. Further, the subset 230 can include a group of sections that are all on the same face (e.g., the face 234) and control the movement of traffic in the same direction (e.g., straight ahead). By way of example, all of the sections in the subset 230 can be used to direct the movement of traffic in the straight ahead direction.

The set 232 can include the section 216 and the section 222. Further, the set 232 can include a group of sections that are on different faces (e.g., the face 236 and the face 238) and control the movement of traffic in the same direction (e.g., straight ahead). By way of example, all of the sections in the set 232 can be used to direct the movement of traffic in the straight ahead direction.

The face 234 can include the section 202, the section 204, the section 206, the section 208, and the section 210. Further, the face 234 can be a separate device from the face 236 and/or the face 238. The face 236 can include the section 212, the section 214, and the section 216. Further, the face 236 can be a separate device from the face 234 and/or the face 238. The face 238 can include the section 218, the section 220, and the section 222. Further, the face 238 can be a separate device from the face 234 and/or the face 236.

Figure 3:
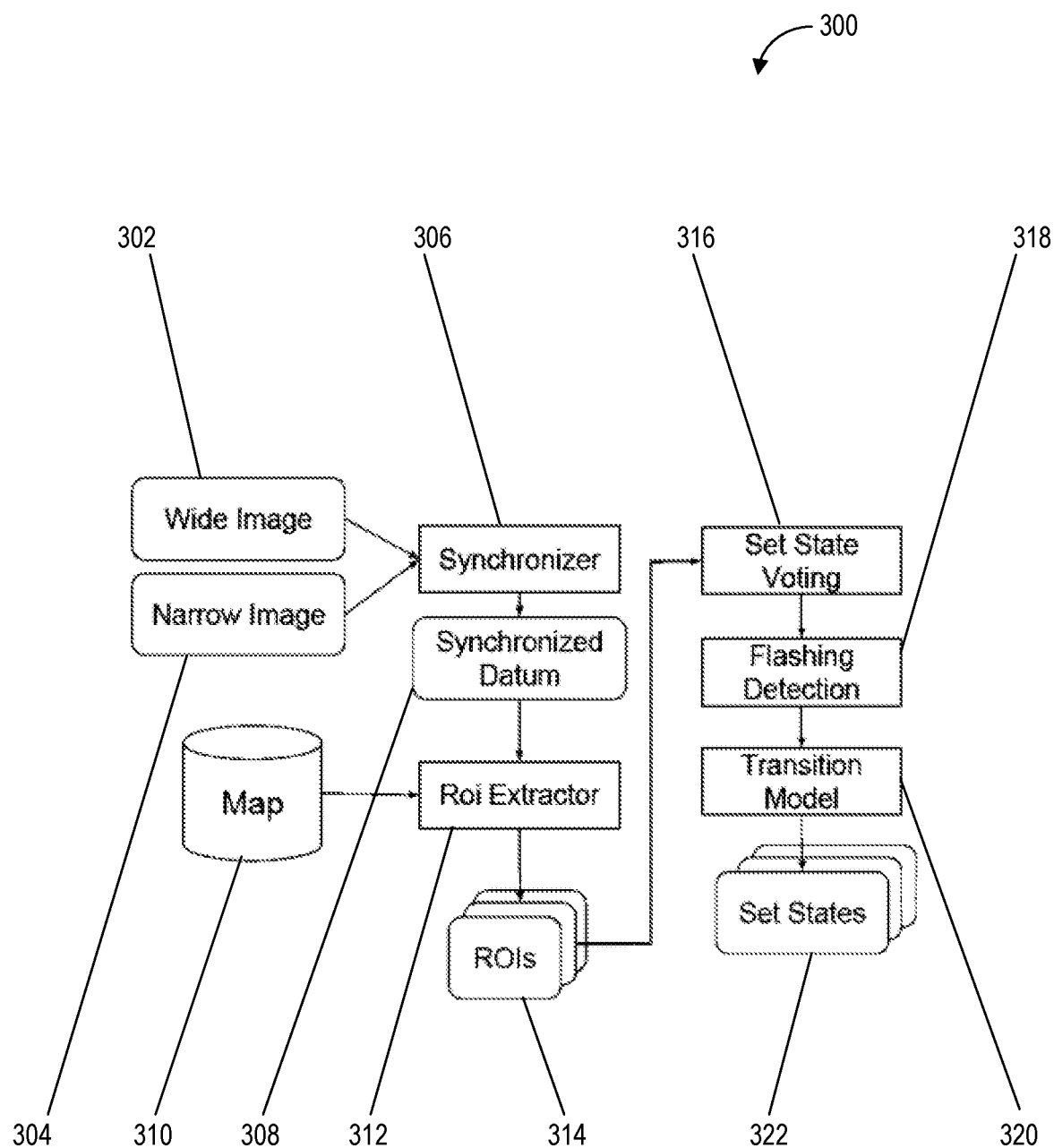
FIG. 3 depicts an example of a traffic signal state classification system according to example embodiments of the present disclosure.

FIG. 3 depicts an example of a traffic signal state classification system according to example embodiments of the present disclosure. One or more operations, actions, and/or events depicted in FIG. 3 can be implemented or performed by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 3 shows a computing system 300 including wide image data 302, narrow image data 304, a synchronizer 306, synchronized data 308, map data 310, a region of interest (ROI) extractor 312, ROI data 314, a voting unit 316, a flash detection unit 318, a transition model unit 320, and state data 322.

The computing system 300 can include one or more machine-learned models (e.g., a convolutional neural network) that can perform operations on data provided as input to the computing system 300.

Furthermore, the computing system 300 can include one or more cameras such as a wide field of view camera (e.g., a camera that can capture a horizontal and/or vertical field of view within a predetermined wide field of view range) configured to capture wide image data 302 and/or a narrow field of view camera (e.g., a camera that can capture a horizontal and/or vertical field of view within a predetermined narrow field of view range) configured to capture narrow image data 304. The wide image data 302 can include one or more images of a traffic signal captured from a camera angle that includes a wide field of view (e.g., a field of view in the range of 80-120 degrees). The narrow image data 304 can include one or more images of a traffic signal captured from a narrow viewing angle (e.g., a field of view in the range of 20-50 degrees). By way of example only, the one or more wide field of view cameras configured to capture wide image data 302 can have a field of view of ninety degrees (90°) and the one or more narrow field of view cameras configured to capture narrow image data 304 can have a field of view of thirty degrees (30°).

The synchronizer 306 can receive the wide image data 302 and/or the narrow image data 304 and output synchronized data 308. Further, the synchronizer 306 can capture the wide image data 302 and the narrow image data 304 at the same time so that the synchronized data 308 is based on the one or more images in the wide image data 302 and the narrow image data 304 that is captured at the same time. The synchronized data 308 can include the output from the synchronizer 306 which can be based at least in part on the wide image data 302 and the narrow image data 304.

The map data 310 can include information including one or more maps of a geographic area. For example, the map data 310 can include one or more maps of an area including the locations of traffic signal devices in the area. Further, the locations of the traffic signal devices in the one or more maps included in the map data 310 can include a latitude, longitude, and altitude associated with the traffic signal devices, and/or a position of the traffic signal devices relative to a point of reference (e.g., the location of the traffic signal devices relative to a road intersection and/or landmark). In some embodiments, map data 310 can include some or all of map data 122 of FIG. 1.

The region of interest extractor 312 can extract regions of interest from images and/or data including the synchronized data 308 and the map data 310. The regions of interest extracted by the region of interest extractor 312 can include regions associated with the synchronized data 308 and/or the map data 310 that are more likely to include information that can be used to determine the state of one or more traffic signals (e.g., one or more traffic signals captured in the images associated with the wide image data 302 and/or the narrow image data 304). The ROI data 314 can include information associated with one or more regions of interest extracted by the region of interest extractor 312.

In some embodiments, the one or more regions of interest included within ROI data 314 can correspond to one or more faces (e.g., the one or more faces of a traffic signal device) of the one or more traffic signals and include one or more sections associated with a corresponding signaling component of the one or more traffic signals (e.g., the light bulb or light emitting diode components of the one or more traffic signals); one or more subsets including the one or more sections that control the same direction of travel in one face of the one or more faces; and/or a set including the one or more sections that control the same direction of travel across any of the one or more faces. Furthermore, the one or more regions of interest within ROI data 314 can be part of an approach that includes the one or more regions of interest ordered chronologically (e.g., the approach includes one or more regions of interest starting with the least recent region of interest for a face and ending with the most recent region of interest for a face).

The voting unit 316 can receive data including the ROI data 314. The voting unit 316 can determine one or more traffic signal states based on the ROI data 314. For example, the voting unit 316 can determine a set of subset states on the face of a traffic signal device (e.g., a green circle on a traffic signal to indicate that a vehicle can proceed). Further, the voting unit 316 can determine a determinative state of a traffic signal based on the majority of subset states being in accordance with the determinative state of the traffic signal. For example, on a traffic signal with three sections, when the top section is red and the other two sections are off or dim, the determinative state of the traffic signal can be determined to be red.

The flash detection unit 318 can determine when a section of a traffic signal in a region of interest in the ROI data 314 is flashing or blinking. In one example, the flash detection unit 318 can determine that a section of a traffic signal is flashing based on the section alternating between a red state and a non-red (e.g., dimmed state) a predetermined number of times within a predetermined time period (e.g., the section can alternate between a red state and a non-red state at a rate of once per second). In another example, flash detection unit 318 can determine that a state of a section of the one or more sections is the flashing state when a brightness of the section alternates between being below a brightness threshold and exceeding the brightness threshold a predetermined number of times within a predetermined time period. For example, flash detection unit 318 can determine that the state of a section of the one or more sections is the flashing state when the intensity of light emitted by a section alternates between exceeding a certain threshold value (e.g., a threshold value measured in candelas) at least four times in two seconds.

The transition model unit 320 can determine when the transition of section states in a traffic signal is correct (e.g., are performed in the correct order). For example, the transition model unit 320 can determine that a section transitioning from a yellow state to a red state is correct but that the section transitioning from a yellow state to a green state is not correct.

The state data 322 can include a determinative state of a traffic signal. For example, the state data 322 can indicate that the determinative state of a traffic signal is green, which can indicate that the movement of traffic can proceed along the direction of travel indicated by the traffic signal.

In some embodiments, the computing system 300 can include one or more features of the vehicle computing system 112 that is depicted in FIG. 1 and can perform one or more operations including receiving sensor data and map data (e.g., sensor data including information associated with an environment detected by one or more sensors of a vehicle and the map data including information associated with one or more locations of one or more traffic signals in the environment); generating, based at least in part on the sensor data and the map data, an input representation including one or more regions of interest associated with one or more images of the one or more traffic signals; sending the input representation to the machine-learned state determination model; determining, based at least in part on output from the machine-learned model state determination model, the one or more states of the one or more traffic signals in the environment; and generating, based at least in part on the one or more states of the one or more traffic signals, traffic signal state data comprising a determinative state of the one or more traffic signals.

Figure 4:
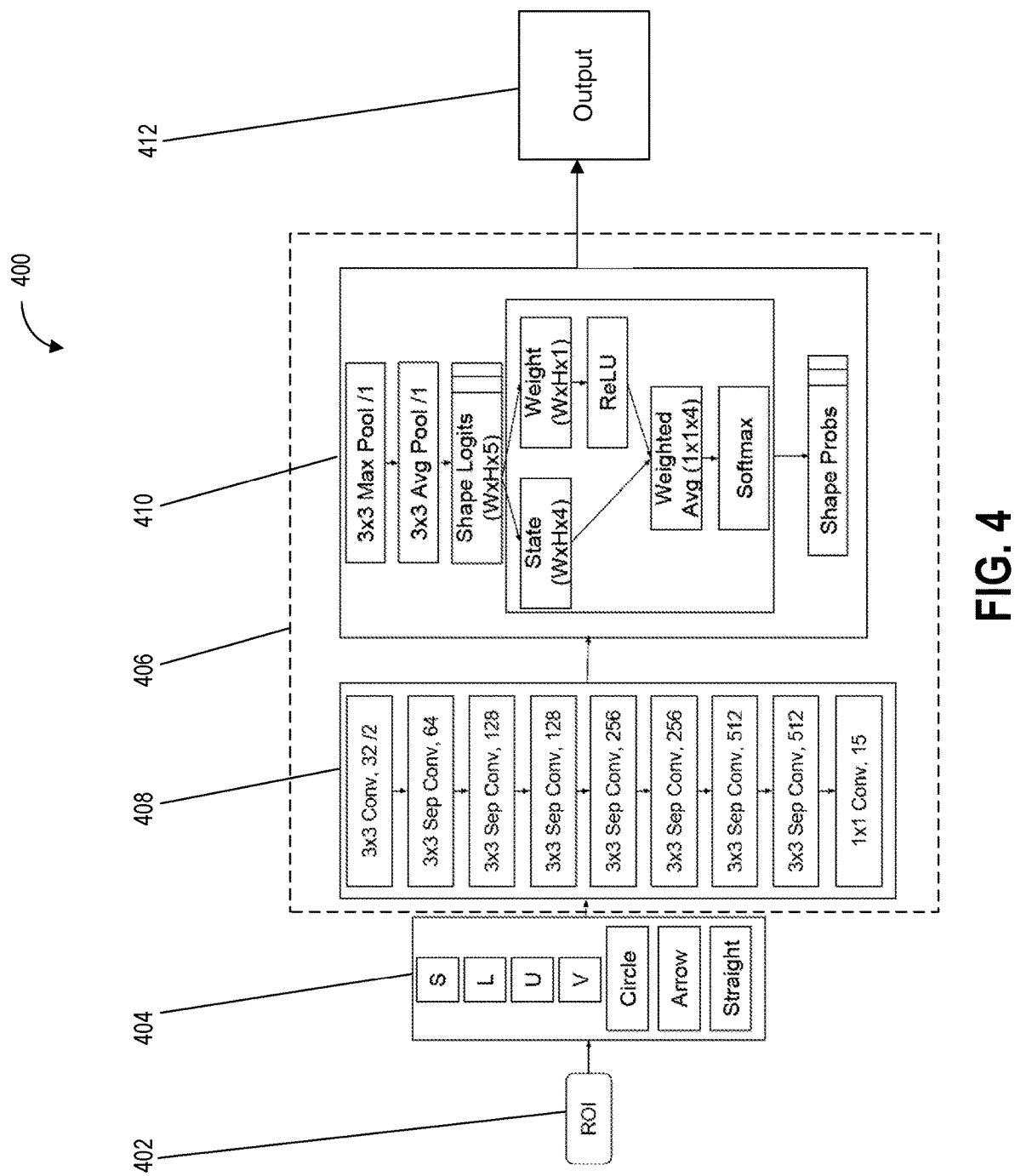
FIG. 4 depicts an example of traffic signal state classification according to example embodiments of the present disclosure.

FIG. 4 depicts an example of traffic signal state classification according to example embodiments of the present disclosure. One or more operations, actions, and/or events depicted in FIG. 4 can be implemented or performed by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 4 shows a computing system 400 that includes data 402, a feature unit 404, layers 408, and layers 410. The computing system 400 can include one or more machine-learned models (e.g., a convolutional neural network) that can perform operations on data provided as input to the computing system 400. The data 402 can include one or more regions of interest (e.g., the one or more regions of interest in the ROI data 314 shown in FIG. 3) associated with one or more states of one or more traffic signals.

The feature unit 404 can determine different features and/or aspects of the one or more regions of interest included in the data 402. For example, the feature unit 404 can be used to determine color channels (e.g., saturation, luminance, and chrominance) and shape channels (e.g., circle, arrow, square, and/or straight line) associated with the data 402. In some embodiments, the feature unit 404 can include one or more layers of a machine-learned model that can receive the data 402 as an input. Further, the feature unit can generate an output (e.g., data for use by a machine-learned model) that can be used as an input representation that is sent to the layer 408.

The output from the feature unit 404 can be sent to a machine-learned state determination model 406 which can include the layers 408 and the layers 410. Further, the machine-learned state determination model can generate an output 412. The layers 408 can be a layer of a machine-learned model (e.g., convolutional layers of a convolutional neural network) that can extract one or more features of the data received from the feature unit 404 by performing convolutions on the data. Further, the layers 408 can generate feature maps based on the data received from the feature unit 404.

The layers 410 can include layers of a machine-learned model (e.g., convolutional layers of a convolutional neural network) that can perform operations on data received from the layers 408 including pooling, passing data through logit functions associated with the shapes, weighting data, passing data through a softmax function, and passing data through an activation function using a rectified linear unit (ReLU). Further, the layer 410 can generate a feature vector including information associated with the probability that certain shapes (e.g., circle or arrow) are detected in a traffic signal.

The output 412 of the machine-learned state determination model 406 can include one or more states of one or more traffic signals in an environment. For example, the one or more states of the one or more traffic signals included in the output 412 can include an on state (e.g., a traffic light of the one or more traffic signals are illuminated) associated with a traffic signal being active; an off state (e.g., a traffic light of the one or more traffic signals is not illuminated) associated with a traffic signal being inactive; a green state indicating the vehicle can proceed; a red state indicating the vehicle should stop (e.g., stop at an intersection or crosswalk until the one or more traffic signals change to a state that is not the red state); a yellow (e.g., amber or orange) state indicating the vehicle can proceed with caution; a flashing state to modify what another state of the one or more states of the one or more traffic signals is indicating (e.g., a flashing red state in which the traffic signal alternates between the red state and the off state can indicate that the vehicle should stop before proceeding instead of just stopping as indicated by the red state that is not flashing); a straight arrow state to indicate the vehicle can proceed straight ahead; a left turn state to indicate that the vehicle can turn left (e.g., turn left at an intersection); a right turn state to indicate that the vehicle can turn right (e.g., turn right at an intersection); a pedestrian walking state to indicate a pedestrian can cross a road; a pedestrian stopping state to indicate that a pedestrian should not cross a road; an unknown state indicating that a state cannot be determined with a confidence greater than a predetermined threshold value; and/or a conflicting state indicating that a difference between two most likely states is less than a predetermined threshold value.

Furthermore, in some embodiments, the output 412 can include one or more confidence scores (e.g., a confidence score indicating the likelihood that the state of a respective section has been accurately determined) which can be determined for all sections in a subset of a traffic signal. The confidence scores for each of the sections can then be used to determine a confidence score for a set. For example, when the determined state of a section is that the yellow circle is illuminated, this state can be associated with a confidence score (e.g., a confidence score of 90%) descriptive of a likelihood that the state has been accurately determined.

In some embodiments, the computing system 400 can include one or more features of the vehicle computing system 112 that is depicted in FIG. 1 and can perform one or more operations including receiving sensor data and map data (e.g., sensor data including information associated with an environment detected by one or more sensors of a vehicle and the map data including information associated with one or more locations of one or more traffic signals in the environment); generating, based at least in part on the sensor data and the map data, an input representation including one or more regions of interest associated with one or more images of the one or more traffic signals; sending the input representation to the machine-learned state determination model; determining, based at least in part on output from the machine-learned model state determination model, the one or more states of the one or more traffic signals in the environment; and generating, based at least in part on the one or more states of the one or more traffic signals, traffic signal state data comprising a determinative state of the one or more traffic signals.

Figure 5:
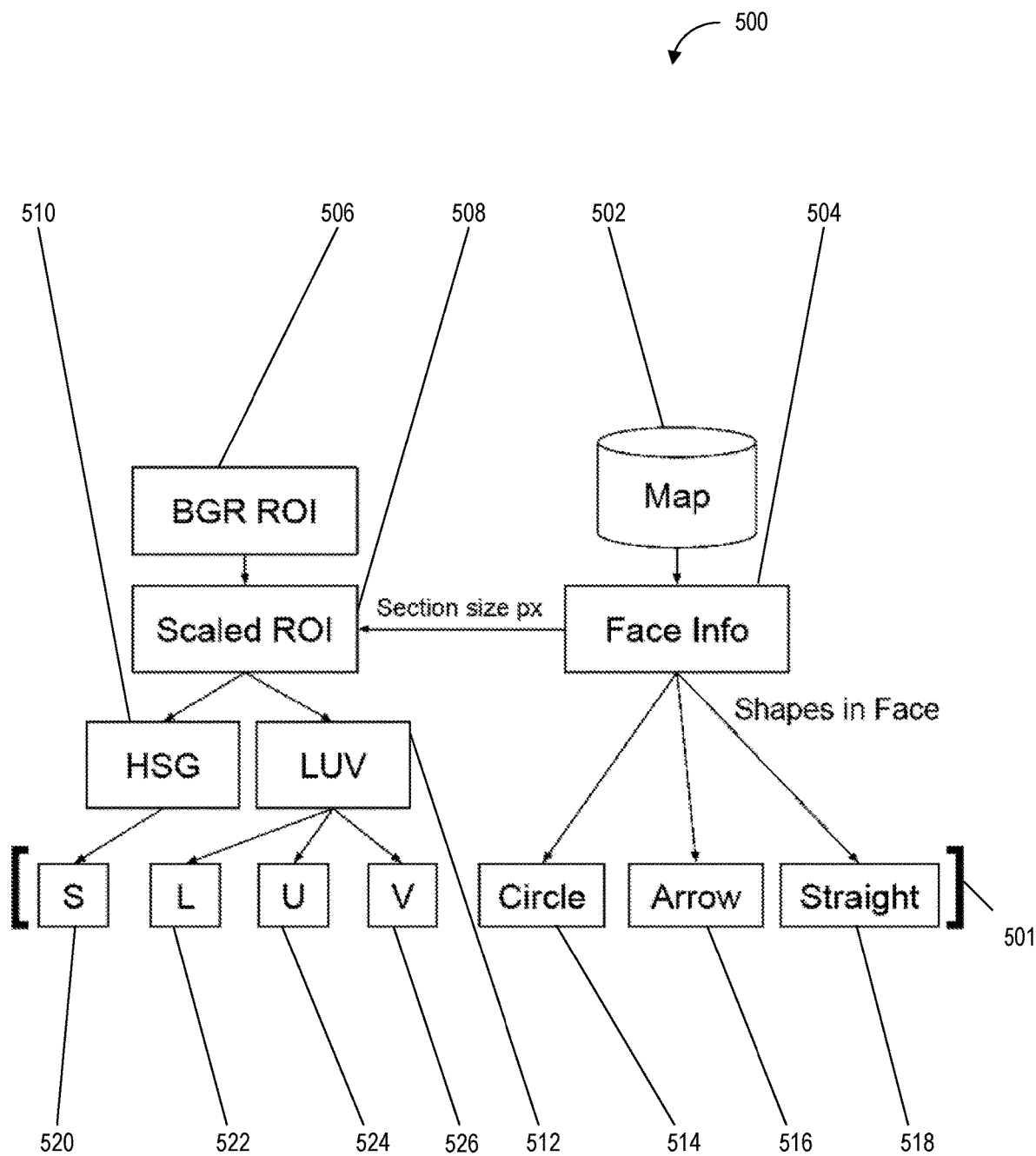
FIG. 5 depicts example aspects of an input representation for traffic signal state classification according to example embodiments of the present disclosure.

FIG. 5 depicts example aspects of an input representation for traffic signal state classification according to example embodiments of the present disclosure. One or more operations, actions, and/or events depicted in FIG. 5 can be implemented or performed by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 5 shows a computing system 500 that can be used in some implementations to generate, based at least in part on the sensor data and the map data (e.g. sensor data 116 and map data 122 of FIG. 1), an input representation 501. Input representation 501 can include a representation of the sensor data that can be used as an input for a machine-learned state determination model. Generally, the input representation 501 can include one or more regions of interest (e.g., regions associated with the sensor data or the map data that are more likely to include information that can be used to determine the state of the one or more traffic signals) associated with one or more images (e.g., images including a plurality of pixels) of the one or more traffic signals in the environment. More particularly, for example, the input representation 501 can include one or more data structures that can be used to represent the one or more traffic signals in the environment by including color space information (e.g., luminance, chrominance, saturation, and/or hue) for a plurality of pixels in the one or more images of the sensor data. Further, the input representation 501 can include shape information associated with the shape of objects within the region of interest (e.g., circular, square, arrow-shaped, horizontal line, diagonal line, vertical line, and/or cross-shaped). More particularly, input representation 501 includes color space information via saturation channel data 520, luminance data channel 522, first chrominance channel 524, and second chrominance channel, while providing shape information via circle data 514, arrow data 516, and straight data 518. Additional portions of intermediate data used to generate input representation 501 can include, for example, map data 502, face info data 504, BGR ROI data 506, scaled ROI data 508, HSG data 510, and LUV data 512.

Referring more particularly to the shape information included within input representation 501, the map data 502 can include information associated with one or more maps of a geographic area. Further, the map data 502 can include one or more locations of traffic signals. For example, map data 502 can include some or all of the map data 122 described with reference to FIG. 1 and/or map data 310 of FIG. 3. The face info data 504 can include information associated with one or more faces (e.g., the face 234 shown in FIG. 2) of one or more traffic signals identified within map data 502. Further, the face info data 504 can include information associated with one or more faces of one or more traffic signals including the location of the one or more faces of the one or more traffic signals and/or the types of sections included in the face (e.g., whether the faces include sections with circles, directional arrows or flashing sections).

The circle data 514 can include information associated with the face info data 504 and can include information associated with a circular object represented in a face of one or more traffic signals. The arrow data 516 can include information associated with the face info data 504 and can include information associated with an arrow shape represented in a face of one or more traffic signals. The straight data 518 can include information associated with the data face info 504 and can include information associated with a straight line shape represented in a face of one or more traffic signals.

Referring more particularly to the color space information provided within input representation 501, BGR ROI data 506 and scaled ROI data 508 generally include data associated with one or more regions of interest within obtained image data from one or more sensors (e.g., wide image data 302 and/or narrow image data 304 of FIG. 3). In some implementations, BGR ROI data 506 and/or scaled ROI data 508 can be part of ROI data 314 of FIG. 3.

the BGR ROI data 506 can include information associated with one or more regions of interest including color space information (e.g., Red/Green/Blue (RGB) or Blue/Green/Red (BGR) color space information) associated with one or more images of the regions of interest. The scaled ROI data 508 can include data associated with scaled versions of the one or more regions of interest. For example, multiple regions of interest represented in images can be resized so that the multiple regions of interest are the same size (e.g., the same number of pixels to represent height and width of a quadrilateral image). The HSG data 510 can include data associated with an HSG color space representation of the scaled regions of interest in the scaled ROI data 508. The LUV data 512 can include data associated with an LUV color space representation of the scaled regions of interest in the scaled ROI data 508.

More particularly, in some implementations, HSG data 510 can correspond to one example multi-parameter image representation that includes distinct values for an image hue (H) parameter, an image saturation (S) parameter, and an image greyscale (G) parameter. The image hue (H) parameter can be representative of the light property for image data that characterizes how color is classified as one of multiple color parameters (e.g., red, green, blue, white, and/or yellow) relative to one or more respective pure reference values for each color parameter in the color spectrum. The image saturation (S) parameter can be representative of the light property for image data that characterizes the intensity of color within the image relative to brightness. The image greyscale (G) parameter can be representative of the light property for image data that characterizes the intensity of monochrome light for each pixel within an image. The use of multi-parameter HSG representations for image data can provide an enhanced image data format that has proven to be beneficial for image-based object detection applications. These benefits can be achieved in part by the type of image information captured using the hue, saturation and greyscale parameters. Saturation channel data 520 is illustrated as one example component of the HSG data 510 included within the input representation 501 of FIG. 5, although other components can be additionally or alternatively included.

Still further, LUV data 512 can correspond to another example multi-parameter image representation that includes distinct values for an image luminance (L) parameter, an image red/green chrominance (U) parameter, and an image blue/yellow chrominance (V) parameter. The image luminance (L) parameter can be representative of the light property for image data that characterizes the intensity or brightness of light within each pixel in an image. The image red/green chrominance (U) parameter can be representative of the light property for image data that characterizes the red and/or green color components in each pixel in an image. The image blue/yellow chrominance (V) parameter can be representative of the light property for image data that characterizes the blue and/or yellow color components in each pixel in an image.

In some embodiments, the computing system 500 can include one or more features of the vehicle computing system 112 that is depicted in FIG. 1 and can perform one or more operations including receiving sensor data and map data (e.g., sensor data including information associated with an environment detected by one or more sensors of a vehicle and the map data including information associated with one or more locations of one or more traffic signals in the environment); generating, based at least in part on the sensor data and the map data, an input representation including one or more regions of interest associated with one or more images of the one or more traffic signals; sending the input representation to the machine-learned state determination model; determining, based at least in part on output from the machine-learned model state determination model, the one or more states of the one or more traffic signals in the environment; and generating, based at least in part on the one or more states of the one or more traffic signals, traffic signal state data comprising a determinative state of the one or more traffic signals.

Figure 6:
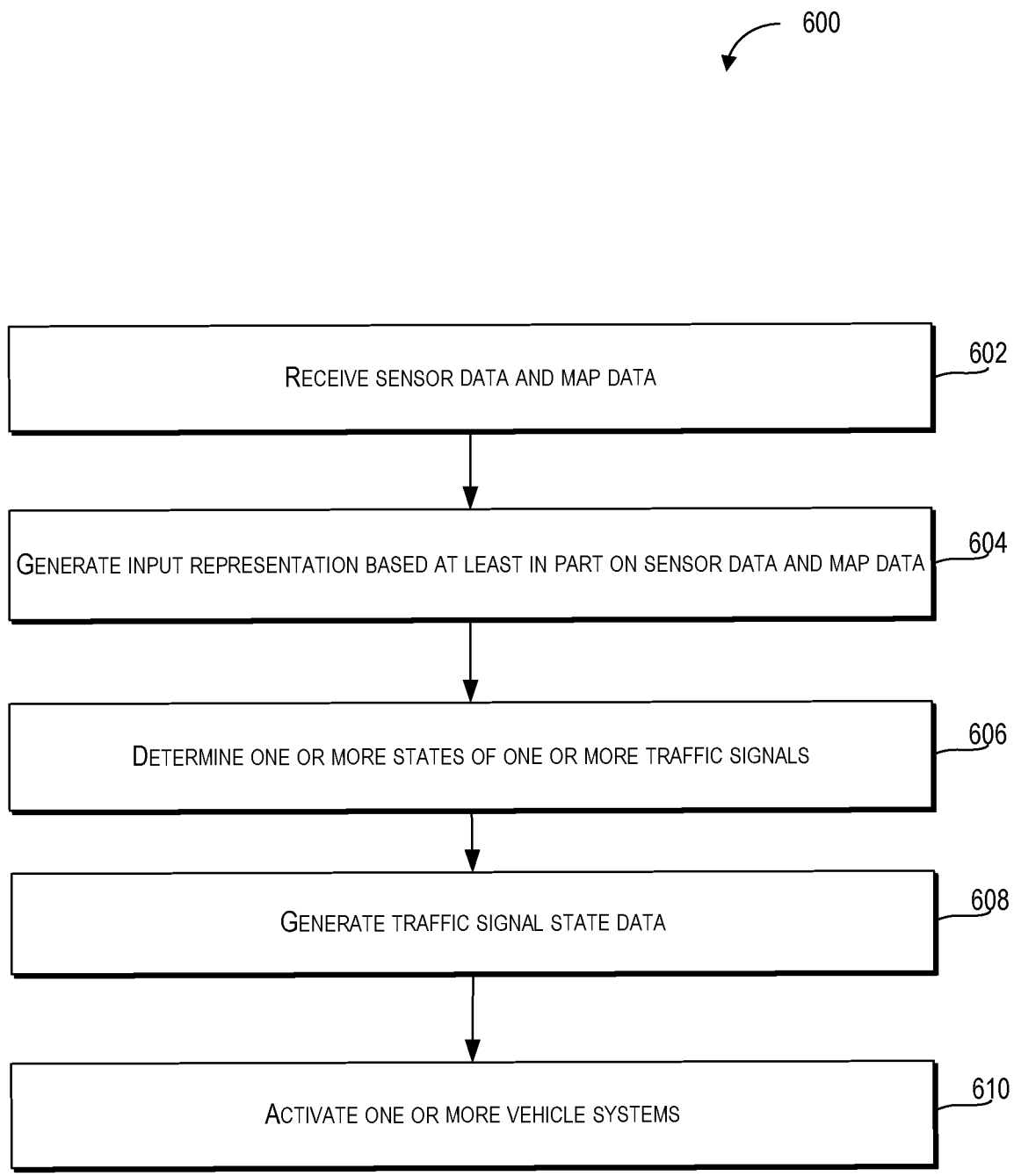
FIG. 6 depicts a flow diagram of an example method of traffic signal state classification according to example embodiments of the present disclosure.

FIG. 6 depicts a first flow diagram of an example method of traffic signal state classification according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, detect and/or determine one or more states of one or more traffic signals. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include receiving sensor data and map data. The sensor data can include information associated with an environment detected by one or more sensors of a vehicle. For example, the vehicle computing system 112 can receive sensor data associated with one or more sensor outputs from one or more sensors of the vehicle 108. For example, the sensor data received at 602 can include sensor data 116 associated with one or more sensor outputs from one or more sensors 114 of FIG. 1. Further, the vehicle computing system 112 can receive map data from a local storage system of the vehicle 108 (e.g., a database of maps stored on a storage device of the vehicle 108) or from a remote storage system (e.g., a remote map provider system). The map data can include information associated with one or more traffic signals (e.g., one or more traffic signals that use one or more lights, shapes, or colors to indicate to vehicle and/or pedestrian traffic, whether to proceed, stop, and/or turn in a specified direction) in the environment. For example, the map data received at 602 can include map data 122 of FIG. 1, map data 310 of FIG. 3, and/or map data 502 of FIG. 5.

In some embodiments, the map data received at 602 can include information associated with one or more locations of the one or more traffic signals in the environment (e.g., one or more geographic locations). For example, vehicle 108 can receive map data including the latitude, longitude, and/or altitude associated with the location of the one or more traffic signals.

Further, the map data received at 602 can include: the one or more geographic locations of the one or more traffic signals (e.g., latitude and longitude of the one or more traffic signals) and/or the location of one or more portions of the one or more traffic signals (e.g., the location of one or more sections, one or more subsets, and/or one or more sets of the one or more traffic signals at a geographic location); the position of the one or more traffic signals relative to the vehicle (e.g., the orientation of the one or more traffic signals with respect to the vehicle, the height of the one or more traffic signals, the distance of the traffic signals from the vehicle, and/or the angle of the one or more traffic signals with respect to the vehicle); the one or more states associated with each of the one or more traffic signals (e.g., the red state, yellow state, or green state associated with each section of a traffic signal); a brightness range associated with a traffic signal (e.g., the brightness intensity of a traffic signal when a traffic signal state is indicated); and/or the operational state of the one or more traffic signals (e.g., whether the one or more traffic signals are operating properly, a time since the last maintenance or replacement of a traffic signal, and/or a time until the next maintenance or replacement of a traffic signal).

Furthermore, the map data received at 602 can include information associated with the environment surrounding the vehicle. For example, map data can include: information (e.g., location and/or type) associated with different travel-ways (e.g., roadways), road segments, sidewalks, buildings, and/or other items or objects (e.g., utility structures, lampposts, crosswalks, and/or curbs); the location and directions of traffic lanes (e.g., the location and direction of a parking lane, a turning lane, a bicycle lane, and/or other lanes within a particular roadway or other travel-way); traffic control data (e.g., the location and instructions of signage, traffic lights, or other traffic control devices); and/or any other map data that provides information that can be used by the vehicle computing system 112 to determine the state of the environment surrounding the vehicle.

In some embodiments, the sensor data received at 602 can be associated with the output of one or more sensors, which can include one or more cameras (e.g., cameras that detect light in the visible light spectrum and/or infrared cameras) and/or one or more thermal sensors. Further, the one or more cameras can include one or more images sensors (e.g., semi-conductor charged coupling device (CCDs) sensors and/or complementary metal-oxide-semiconductor (CMOS) sensors).

In some embodiments the one or more cameras can include one or more wide field of view cameras or one or more narrow field of view cameras. For example, the vehicle 108 can include one or more wide field of view cameras with a field of view of ninety degrees (90°) and one or more narrow field of view cameras with a field of view of thirty degrees (30°).

At 604, the method 600 can include generating, based at least in part on the sensor data and the map data received at 602, an input representation including one or more regions of interest associated with one or more images of the one or more traffic signals. For example, the vehicle computing system 112 can generate an input representation that includes one or more images of one or more traffic signals in the environment detected by sensors of the vehicle 108.

Furthermore, the input representation can include color space information (e.g., luminance, chrominance, saturation, and/or hue) for a plurality of pixels in the one or more images of the sensor data. Further, the input representation can include shape information associated with the shape of objects within the region of interest (e.g., circular, square, diamond, rectangular, left turn arrow, right-turn arrow, horizontal line, diagonal line, vertical line, and/or cross-shaped). One example input representation including color space information and shape information can correspond to input representation 501 of FIG. 5.

Further, the input representation can be in accordance with a format (e.g., image dimensions and/or color space information) that can be used by a machine-learned state determination model operating of the vehicle computing system 112.

In some embodiments, the one or more regions of interest can correspond to one or more faces of the one or more traffic signals and comprise one or more sections associated with a corresponding signaling component of the one or more traffic signals, one or more subsets including the one or more sections that control the same direction of travel in one face of the one or more faces, or a set including the one or more sections that control the same direction of travel across any of the one or more faces.

At 606, the method 600 can include determining, based at least in part on the input representation generated at 604 and a machine-learned model, one or more states of the one or more traffic signals in the environment. For example, the vehicle computing system 112 can include a machine-learned model to which the input representation generated at 604 can be sent as input. The machine-learned model of the vehicle computing system 112 can then generate an output based on the input representation. The output from the machine-learned model can include the one or more states of the one or more traffic signals in the environment.

In some embodiments, the one or more states of the one or more traffic signals determined at 606 can include an on state associated with a traffic signal being active, an off state associated with a traffic signal being inactive, a green state indicating the vehicle can proceed, a red state indicating the vehicle should stop, a yellow state indicating the vehicle can proceed with caution, a flashing state to modify what another state of the one or more states of the one or more traffic signals is indicating (e.g., a flashing red light may indicate that a vehicle should stop at an intersection before proceeding), a straight arrow state to indicate the vehicle can proceed straight ahead (e.g., a vehicle should proceed straight ahead through an intersection), a left turn state to indicate the vehicle can turn left (e.g., a vehicle should turn left at an intersection), a right turn state to indicate the vehicle can turn right (e.g., a vehicle should turn right at an intersection), or a pedestrian walking state to indicate a pedestrian can cross a road.

In some embodiments the machine-learned model used to determine one or more states of one or more traffic signals at 606 can include a convolutional neural network, a recurrent neural network, and/or a recursive neural network. Further, in some embodiments, the machine-learned model can be trained based at least in part on a plurality of training images including one or more shapes. The plurality of training images can be associated with a plurality of features and a plurality of shape labels corresponding to the one or more shapes within the plurality of training images. Further, the plurality of shape labels can be independent of a location of the one or more shapes within each of the plurality of training images.

Further, the plurality of training images used to train the machine-learned state determination model can include images of different types of traffic signals (e.g., traffic signals of different sizes and/or shapes) in a variety of environments (e.g., urban environments, rural environments), conditions (e.g., nighttime, daytime, snowing conditions, rainy conditions, captured from various camera angles. Further, the vehicle computing system 112 can include a memory device that stores instructions associated with the machine-learned state determination model. The vehicle computing system 112 can then perform operations including using the machine-learned state determination model to receive the input representation as an input and generate an output based on the operations the machine-learned state determination model performs on the input.

In some embodiments, the plurality of training images can be associated with a plurality of features and a plurality of color labels corresponding to the one or more colors within the plurality of training images. Further, the plurality of color labels can be independent of a location of the one or more shapes within each of the plurality of training images.

At 608, the method 600 can include generating, based at least in part on the one or more states of the one or more traffic signals determined at 606, traffic signal state data including a determinative state of the one or more traffic signals. For example, the vehicle computing system 112 can generate traffic signal state data that includes information associate with the one or more states of the one or more traffic signals including the determinative state of the one or more traffic signals. The determinative state of the one or more traffic signals can include the state that the vehicle computing system 112 determines to correspond to the indication that the one or more traffic signals are providing. For example, the determinative state can be a red state to indicate that the vehicle 108 should stop at an intersection, or a green state to indicate that the vehicle 108 may proceed through an intersection without stopping.

At 610, the method 600 can include activating, based at least in part on the traffic signal state data, one or more vehicle systems associated with operation of the vehicle. The one or more vehicle systems can include one or more braking systems, one or more steering systems, and/or one or more vehicle acceleration systems (e.g., one or more engines or motors). For example, the vehicle 108 can activate a braking system of the vehicle 108 based on traffic signal state data generated at 608 that indicates that the determinative state of a traffic signal is a red state.

Figure 7:
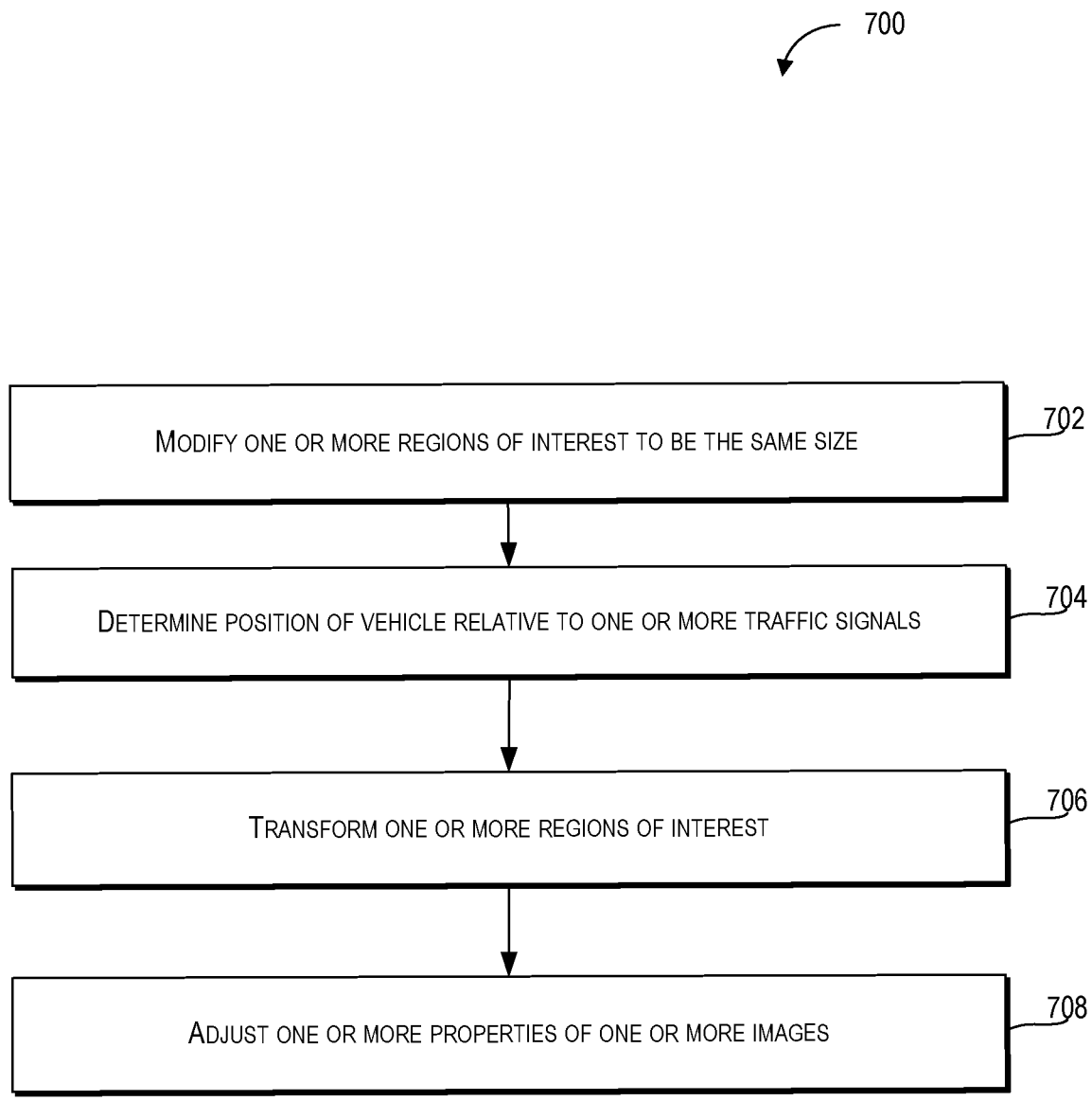
FIG. 7 depicts a flow diagram of an example method of generating an input representation of image data according to example embodiments of the present disclosure.

FIG. 7 depicts a flow diagram of an example method of generating an input representation of image data according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, detect and/or determine one or more states of one or more traffic signals. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

In some embodiments, generating the input representation (e.g., the input representation of the method 600) can include one or more of the steps depicted in method 700 of FIG. 7.

At 702, the method 700 can include modifying the one or more regions of interest in the one or more images to be the same size. For example, the vehicle computing system 112 can modify the size of a set of images that includes images of different sizes (e.g., different image dimensions) to be the same size as the largest or smallest image in the set of images. In some embodiments, modifying the one or more regions of interest at 702 can result in scaled ROI data such as scaled ROI data 508 of FIG. 5.

In some embodiments, generating the input representation (e.g., the input representation of the method 600) can include modifying the one or more regions of interest in the one or more images to be the same size.

At 704, the method 700 can include determining a position of the vehicle relative to the one or more traffic signals. For example, the vehicle computing system 112 can determine the position of the vehicle relative to the one or more traffic signals based on one or more sensor outputs (e.g., LIDAR device outputs or camera outputs). Further, the vehicle computing system 112 can determine the position of the vehicle relative to the one or more traffic signals based in part on a vehicle position determined using a remote signal (e.g., a GPS signal) and map data (e.g., map data 122 of FIG. 1) including the location of the one or more traffic signals.

In some embodiments, generating the input representation (e.g., the input representation of the method 600) can include determining the position of the vehicle relative to the one or more traffic signals.

At 706, the method 700 can include transforming the one or more regions of interest in the one or more images to be the same shape based at least in part on the position of the vehicle relative to the one or more traffic signals. For example, the vehicle computing system 112 can apply one or more image transformations (e.g., skewing, curving, and/or stretching) to the one or more regions of interest to make the one or more regions of interest the same shape.

In some embodiments, generating the input representation (e.g., the input representation of the method 600) can include transforming the one or more regions of interest in the one or more images to be the same shape based at least in part on the position of the vehicle relative to the one or more traffic signals.

At 708, the method 700 can include adjusting one or more properties of the one or more images. Adjusting the one or more properties can include underexposing the one or more images, modifying a light intensity associated with the one or more images, modifying a hue associated with the one or more images, and/or modifying a saturation associated with the one or more images. For example, the vehicle 112 can underexpose an image so that the less brightly lit portions of the image (e.g., trees and other non-luminous objects in the background) are deemphasized and the more brightly lit portions of the image (e.g., a bright red traffic signal) are emphasized.

Furthermore, in some implementations, adjusting one or more properties of the one or more images can include converting image data from the one or more images into one or more multi-parameter representations including an HSG representation and/or an LUV representation (e.g., a multi-parameter representation embodied by HSG data 510 and/or LUV data 512 of FIG. 5).

In some embodiments, generating the input representation (e.g., the input representation of the method 600) can include adjusting the one or more properties of the one or more images.

Figure 8:
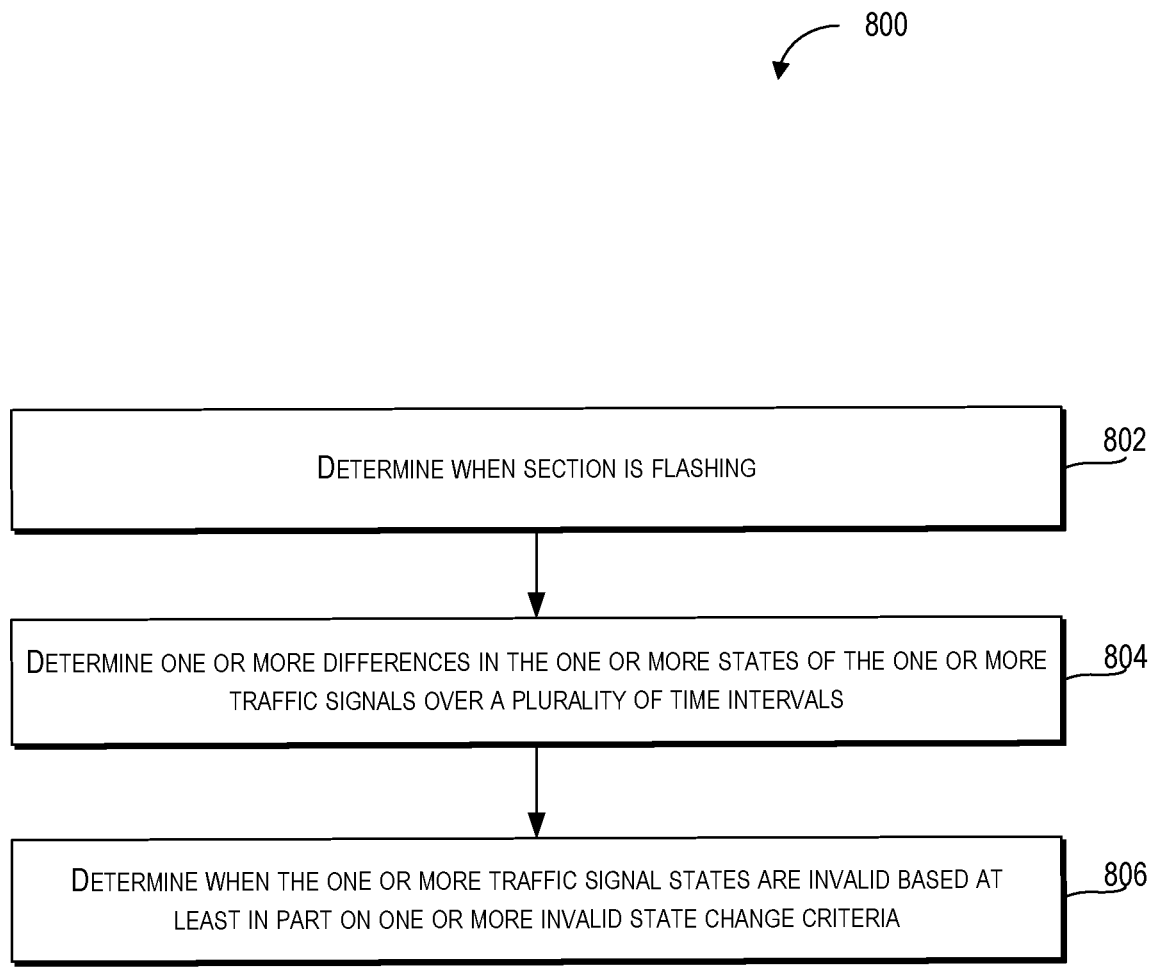
FIG. 8 depicts a flow diagram of additional aspects of an example method of traffic signal state classification according to example embodiments of the present disclosure.

FIG. 8 depicts a flow diagram of additional aspects of an example method of traffic signal state classification according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, detect and/or determine one or more states of one or more traffic signals. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include determining, based at least in part on the sensor data, that a state of a section of the one or more sections is the flashing state when a brightness of the section alternates between being below a brightness threshold and exceeding the brightness threshold a predetermined number of times within a predetermined time period. For example, the vehicle computing system 112 can determine that the state of a section of the one or more sections is the flashing state when the intensity of light emitted by a section alternates between exceeding a certain threshold value (e.g., a threshold value measured in candelas) at least four times in two seconds.

In some embodiments, determining the one or more states of the one or more traffic signals (e.g., the one or more states of the one or more traffic signals in the method 600) in the environment can include determining, based at least in part on the sensor data, that a state of a section of the one or more sections is the flashing state when a brightness of the section alternates between being below a brightness threshold and exceeding the brightness threshold a predetermined number of times within a predetermined time period. In some implementations, determining when a section is flashing at 802 is implemented by a flash detection unit within a computing system (e.g., flash detection unit 318 of FIG. 3.)

At 804, the method 800 can include determining, based at least in part on the sensor data, one or more differences in the one or more states of the one or more traffic signals over a plurality of time intervals. For example, the vehicle computing system 112 can determine the differences in the color and/or shape of the one of the one or more sections of the one or more traffic signals over a thirty second traffic signal cycle (e.g., the time for the traffic signal to change state from green to yellow to red and then back to green).

In some embodiments, determining the one or more states of the one or more traffic signals (e.g., the one or more states of the one or more traffic signals in the method 600) in the environment can include determining, based at least in part on the sensor data, one or more differences in the one or more states of the one or more traffic signals over a plurality of time intervals.

At 806, the method 800 can include determining that the one or more states of the one or more traffic signals are invalid when the one or more differences in the one or more states of the one or more traffic signals over the plurality of time intervals satisfy one or more invalid state change criteria. For example, the vehicle computing system 112 can determine that the one or more states of the one or more traffic signals are invalid when the state of a traffic signal changes from a red state to a yellow state and then to a green state within two seconds.

In some embodiments, determining the one or more states of the one or more traffic signals (e.g., the one or more states of the one or more traffic signals in the method 600) in the environment can include determining that the one or more states of the one or more traffic signals are invalid when the one or more differences in the one or more states of the one or more traffic signals over the plurality of time intervals satisfy one or more invalid state change criteria.

In some embodiments, the one or more invalid state change criteria can include two or more conflicting states of the one or more traffic signals occurring simultaneously (e.g., a traffic signal that indicates a red state and a green state at the same time) and/or an invalid transition of the one or more states over successive time intervals of the plurality of time intervals (e.g., the traffic signal state alternating between a red state and a yellow state for twenty seconds).

Figure 9:
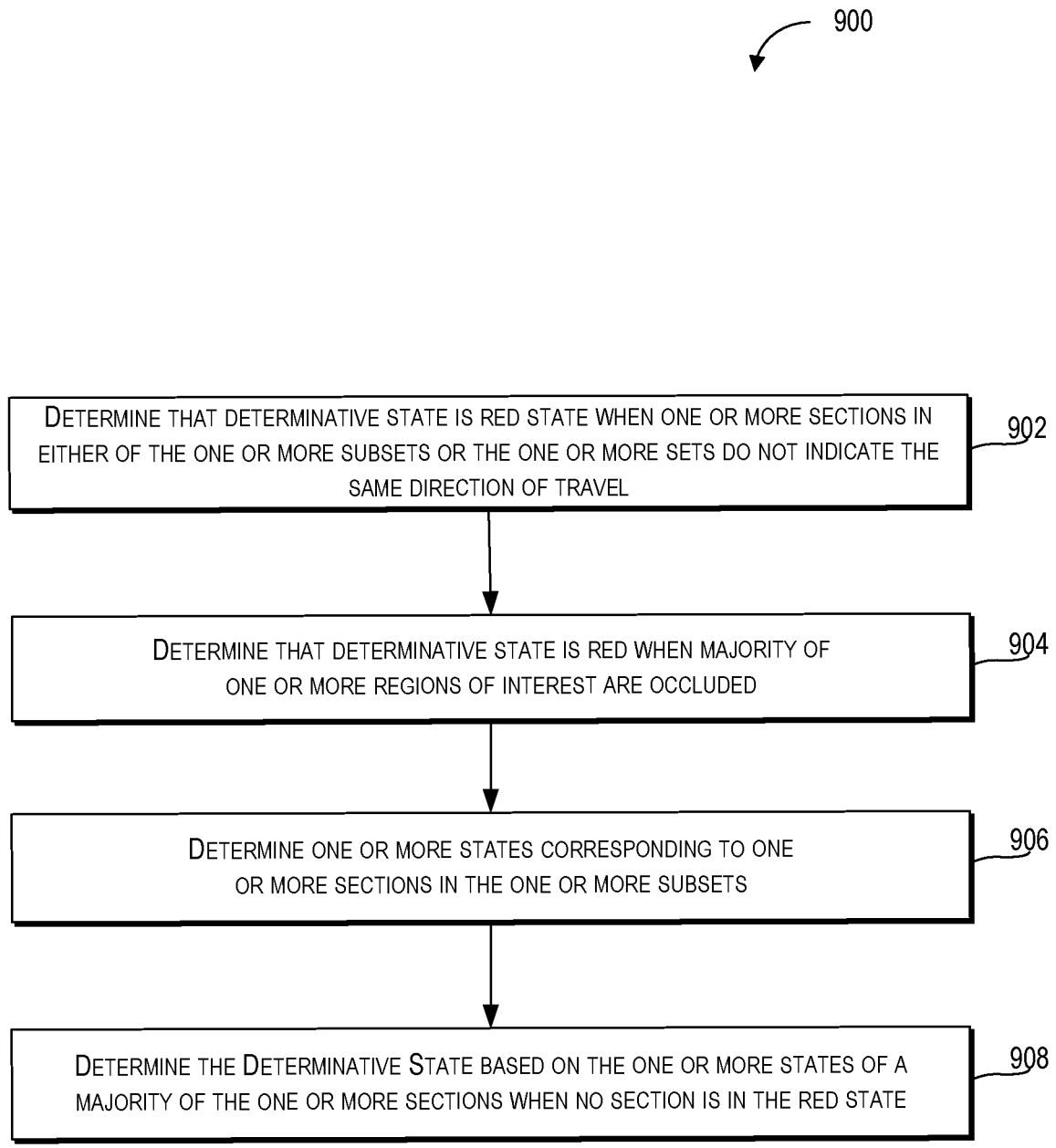
FIG. 9 depicts a flow diagram of additional aspects of an example method of determining traffic signal state data according to example embodiments of the present disclosure.

FIG. 9 depicts a flow diagram of additional aspects of an example method of determining traffic signal state data according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, detect and/or determine one or more states of one or more traffic signals. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include determining that the determinative state of the one or more traffic signals is the red state when the one or more sections in either of the one or more subsets or the one or more sets do not indicate the same direction of travel. For example, the vehicle computing system 112 can determine that the determinative state of a traffic signal is the red state when two of the sections in a subset indicate a left turn and a right turn at the same time.

In some embodiments, generating, the traffic signal state data including a determinative state of the one or more traffic signals (e.g., the determinative state of the one or more traffic signals in the method 600) can include determining that the determinative state of the one or more traffic signals is the red state when the one or more sections in either of the one or more subsets or the one or more sets do not indicate the same direction of travel.

At 904, the method 900 can include determining that the determinative state of the one or more traffic signals is the red state when a majority of the one or more regions of interest is at least partly occluded. For example, when a group of sections of a traffic signal are blocked by a tree branch the vehicle computing system 112 can determine that the determinative state of the traffic signal is the red state.

In some embodiments, generating, the traffic signal state data including a determinative state of the one or more traffic signals (e.g., the determinative state of the one or more traffic signals in the method 600) can include determining that the determinative state of the one or more traffic signals is the red state when a majority of the one or more regions of interest is at least partly occluded.

At 906, the method 900 can include determining the one or more states corresponding to the one or more sections in the one or more subsets. For example, the vehicle computing system 112 can determine the color (e.g., red, green, or yellow) and/or shape (e.g., circle or left turn arrow) of the sections in the subsets of the traffic signals. The information about which sections are in which subsets can then be included in the traffic signal state data.

In some embodiments, generating, the traffic signal state data including a determinative state of the one or more traffic signals (e.g., the determinative state of the one or more traffic signals in the method 600) can include determining the one or more states corresponding to the one or more sections in the one or more subsets.

At 908, the method 900 can include determining the determinative state of the one or more traffic signals based at least in part on the one or more states of a majority of the one or more sections in the one or more subsets when none of the one or more sections are in the red state. For example, in a traffic signal with three sections (e.g., sections corresponding to a red state, a yellow state, and a green state), when none of the sections are in the red state and two of the sections indicate a yellow state that is off and a red state that is off, the vehicle computing system 112 can determine that the determinative state is the green state since the two other states of the traffic signal concur on the determinative state being green.

In some embodiments, generating, the traffic signal state data including a determinative state of the one or more traffic signals (e.g., the determinative state of the one or more traffic signals in the method 600) can include determining the determinative state of the one or more traffic signals based at least in part on the one or more states of a majority of the one or more sections in the one or more subsets when none of the one or more sections are in the red state.

Figure 10:
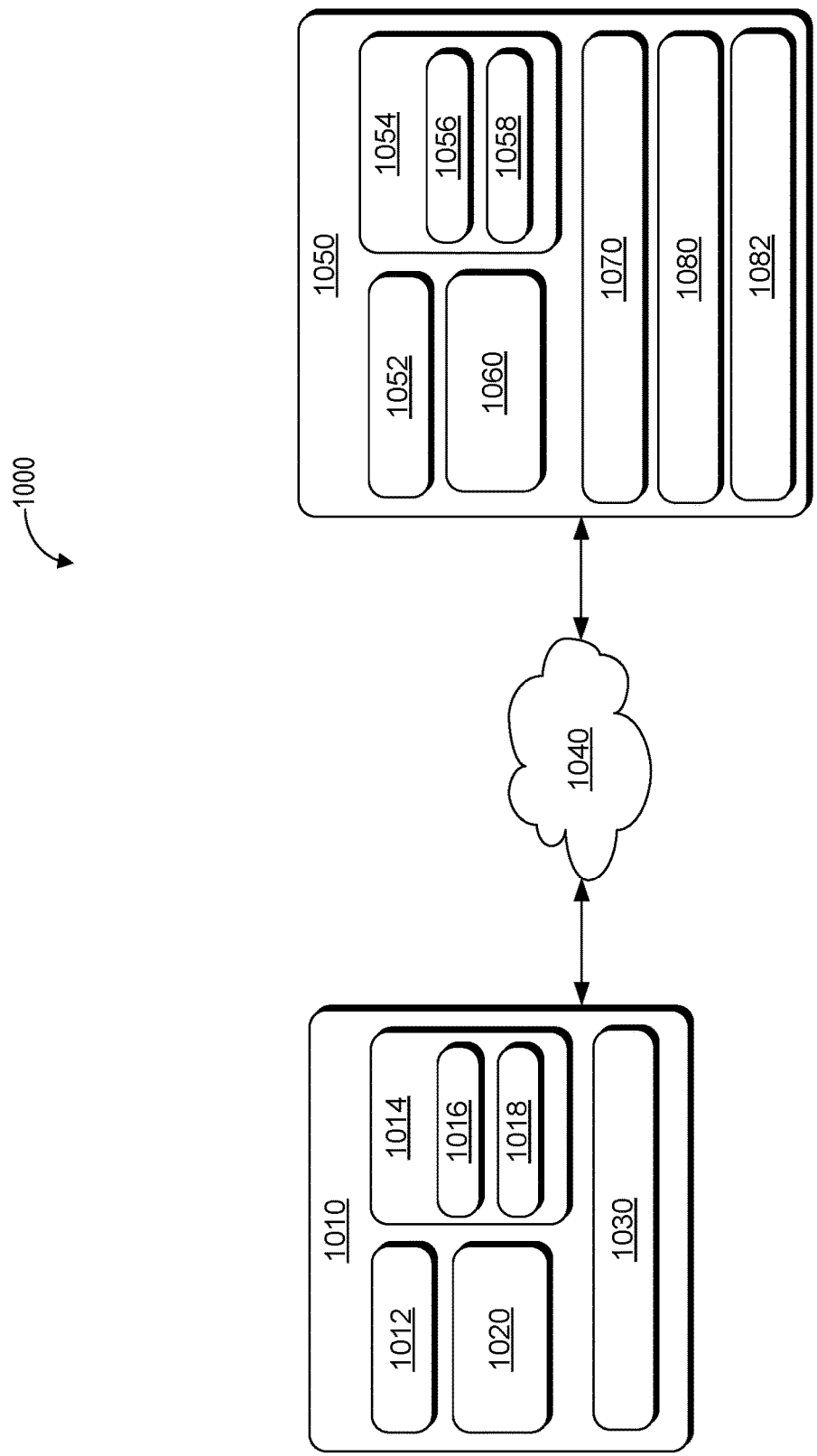
FIG. 10 depicts a diagram of an example system including a machine learning computing system according to example embodiments of the present disclosure.

FIG. 10 depicts a block diagram of an example computing system 1000 according to example embodiments of the present disclosure. The example computing system 1000 includes a computing system 1010 and a machine-learning computing system 1050 that are communicatively coupled over a network 1040. Moreover, the computing system 1000 can include one or more features, functions, devices, elements, and/or components of the system 100 and can perform one or more of the techniques, functions, and/or operations described herein.

In some implementations, the computing system 1010 can perform various operations including determining one or more states of objects in an environment including the determination of the states of one or more traffic signals (e.g., determining one or more features of the one or more traffic signals including their color, shape, size, location, and/or brightness). In some implementations, the computing system 1010 can be included in an autonomous vehicle. For example, the computing system 1010 can be on-board the autonomous vehicle. In other implementations, the computing system 1010 is not located on-board the autonomous vehicle. For example, the computing system 1010 can operate offline to determine one or more states of objects in an environment including the determination of the states of one or more traffic signals (e.g., determining one or more features of the one or more traffic signals including their color, shape, size, location, and/or brightness). Further, the computing system 1010 can include one or more distinct physical computing devices.

The computing system 1010 includes one or more processors 1012 and a memory 1014. The one or more processors 1012 can include any suitable processing device (e.g., a processing device including one or more of a processor core, a microprocessor, an application specific integrated circuit (ASIC), a field programmable gate array (FPGA), a controller, and/or a microcontroller) and can include one processor or a plurality of processors that are operatively connected. The memory 1014 can include one or more tangible non-transitory computer-readable storage media, including Random access memory (e.g., RAM), Read-only memory (ROM), electronically erasable programmable read-only memory (EEPROM), erasable programmable read-only memory (EPROM), non-volatile random access memory (NVRAM), one or more memory devices, flash memory devices, and/or any combinations thereof.

The memory 1014 can store information that can be accessed by the one or more processors 1012. For instance, the memory 1014 (e.g., one or more tangible non-transitory computer-readable storage mediums, memory devices) can store data 1016 that can be obtained, received, accessed, written, manipulated, created, and/or stored. The data 1016 can include, for instance, data associated with the state of a vehicle; and/or the state of the environment external to the vehicle (e.g., the state of one or more traffic signals external to the vehicle) as described herein. In some implementations, the computing system 1010 can obtain data from one or more memory devices that are remote from the system 1010.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on the one or more processors 1012.

For example, the memory 1014 can store instructions 1018 that when executed by the one or more processors 1012 cause the one or more processors 1012 to perform any of the operations and/or functions described herein, including, for example, receiving map data and sensor data (sensor data from one or more sensors of the vehicle 118); generating an input representation based on the map data and sensor data; determining one or more states of one or more traffic signals, based on the input representation; and/or generating traffic signal data based on the states of the one or more traffic signals.

According to an aspect of the present disclosure, the computing system 1010 can store or include one or more machine-learned state determination models 1030. As examples, the one or more machine-learned state determination models 1030 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1010 can receive the one or more machine-learned state determination models 1030 from the machine-learning computing system 1050 over the network 1040 and can store the one or more machine-learned state determination models 1030 in the memory 1014. The computing system 1010 can then use or otherwise implement the one or more machine-learned state determination models 1030 (e.g., by the one or more processors 1012). In particular, the computing system 1010 can implement the one or more machine-learned state determination models 1030 to determine a state of an environment (e.g., an environment external to the vehicle) including one or more features of one or more objects in the environment (e.g., the shape, size, and/or color of one or more traffic signals); detect, recognize, and/or classify one or more objects in the environment external to the vehicle; and/or determine one or more locations of one or more objects in the environment external to the vehicle.

The machine-learning computing system 1050 includes one or more processors 1052 and a memory 1054. The one or more processors 1052 can be any processing device (e.g., a processing device including one or more of a processor core, a microprocessor, an ASIC, a FPGA, a controller, and/or a microcontroller) and can be one processor or a plurality of processors that are operatively connected. The memory 1054 can include one or more tangible non-transitory computer-readable storage media, such as RAM, ROM, EEPROM, EPROM, NVRAM, one or more memory devices, flash memory devices, and/or any combinations thereof.

The memory 1054 can store information that can be accessed by the one or more processors 1052. For instance, the memory 1054 (e.g., one or more tangible non-transitory computer-readable storage mediums, memory devices) can store data 1056 that can be obtained, received, accessed, written, manipulated, created, and/or stored. The data 1056 can include, for instance, information associated with a state of the environment external to the vehicle (e.g., the state of one or more traffic signals) as described herein. In some implementations, the machine-learning computing system 1050 can obtain data from one or more memory devices that are remote from the system 1050.

The memory 1054 can also store computer-readable instructions 1058 that can be executed by the one or more processors 1052. The instructions 1058 can be software written in any suitable programming language or can be implemented in hardware. Additionally, or alternatively, the instructions 1058 can be executed in logically and/or virtually separate threads on the one or more processors 1052.

For example, the memory 1054 can store instructions 1058 that when executed by the one or more processors 1052 cause the one or more processors 1052 to perform any of the operations and/or functions described herein, including, for example, receiving map data and sensor data (sensor data from one or more sensors of the vehicle 118); generating an input representation based on the map data and sensor data; determining one or more states of one or more traffic signals, based on the input representation; and/or generating traffic signal data based on the states of the one or more traffic signals.

In some implementations, the machine-learning computing system 1050 includes one or more server computing devices. In implementations in which the machine-learning computing system 1050 includes multiple server computing devices, such server computing devices can operate according to various computing architectures, including, for example, sequential computing architectures, parallel computing architectures, and/or some combination thereof.

In addition or alternatively to the one or more machine-learned state determination models 1030 at the computing system 1010, the machine-learning computing system 1050 can include one or more machine-learned state determination models 1070. As examples, the one or more machine-learned state determination models 1070 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine-learning computing system 1050 can communicate with the computing system 1010 according to a client-server relationship. For example, the machine-learning computing system 1050 can implement the one or more machine-learned state determination models 1070 to provide a web service to the computing system 1010. For example, the web service can provide a state of one or more objects in an environment (e.g., the state of one or more traffic signals in an environment).

Further, the one or more machine-learned state determination models 1030 can be located and used at the computing system 1010 and/or one or more machine-learned state determination models 1070 can be located and used at the machine-learning computing system 1050. In some implementations, the machine-learning computing system 1050 and/or the computing system 1010 can train the one or more machine-learned state determination models 1030 and/or the one or more machine-learned state determination models 1070 through use of a model trainer 1080. The model trainer 1080 can train the one or more machine-learned state determination models 1030 and/or the one or more machine-learned state determination models 1070 using one or more training or learning algorithms. One example training technique is backwards propagation of errors. In some implementations, the model trainer 1080 can perform supervised training techniques using a set of labeled training data. In other implementations, the model trainer 1080 can perform unsupervised training techniques using a set of unlabeled training data. The model trainer 1080 can perform a number of generalization techniques to improve the generalization capability of the models being trained. Generalization techniques include weight decays, dropouts, or other techniques.

In particular, the model trainer 1080 can train a machine-learned state determination model 1030 and/or the one or more machine-learned state determination models 1070 based on a set of training data 1082. The training data 1082 can include, for example, a plurality of objects including traffic signal objects (e.g., one or more traffic signals with different colors, shapes, and/or sizes), vehicle objects, pedestrian objects, passenger objects, cyclist objects, road sign objects, road marker objects, building objects, and/or road objects. In some embodiments, the machine-learned state determination model 1030 and/or 1070 can be trained based at least in part on training data 1082 including a plurality of training images comprising one or more shapes (e.g., circles, arrows, and/or straight lines). The plurality of training images can be associated with a plurality of features and a plurality of shape labels corresponding to the one or more shapes within the plurality of training images. Further, the plurality of shape labels can be independent of a location of the one or more shapes within each of the plurality of training images. Training the machine-learned state determination model 1030 and/or 1070 can include the use of a loss function that includes a sum of the losses for each shape (e.g., circle, arrow, straight). Further, each shape loss function can include the weighted sum of four components (e.g., red state, green state, yellow state, or unknown state) for the respective shape. The loss function used by the machine-learned state determination model 1030 and/or 1070 can also include the use of max weight regularization to prevent weights from growing too large, average weight regularization to make weights target a more focused area (e.g., the face of a traffic signal) to prevent a whole image from being heavily weighted, and minimum weight regularization to prevent the machine-learned state determination model 1030 and/or 1070 from learning strong negative weights. The model trainer 1080 can be implemented in hardware, firmware, and/or software controlling one or more processors.

The computing system 1010 can also include a network interface 1020 used to communicate with one or more systems or devices, including systems or devices that are remotely located from the computing system 1010. The network interface 1020 can include any circuits, components, and/or software, for communicating with one or more networks (e.g., the network 1040). In some implementations, the network interface 1020 can include, for example, one or more of a communications controller, receiver, transceiver, transmitter, port, conductors, software and/or hardware for communicating data. Similarly, the machine-learning computing system 1050 can include a network interface 1060.

The network 1040 can be any type of one or more network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the network 1040 can be accomplished, for instance, via a network interface using any type of protocol, protection scheme, encoding, format, and/or packaging.

In some embodiments, the system 1000 can include one or more features of the vehicle computing system 112 that is depicted in FIG. 1 and can perform one or more operations including receiving sensor data and map data (e.g., sensor data including information associated with an environment detected by one or more sensors of a vehicle and the map data including information associated with one or more locations of one or more traffic signals in the environment); generating, based at least in part on the sensor data and the map data, an input representation including one or more regions of interest associated with one or more images of the one or more traffic signals; sending the input representation to the machine-learned state determination model; determining, based at least in part on output from the machine-learned model state determination model, the one or more states of the one or more traffic signals in the environment; and generating, based at least in part on the one or more states of the one or more traffic signals, traffic signal state data comprising a determinative state of the one or more traffic signals.

FIG. 10 illustrates one example computing system 1000 that can be used to implement the present disclosure. Other computing systems can be used as well. For example, in some implementations, the computing system 1010 can include the model trainer 1080 and the training dataset 1082. In such implementations, the one or more machine-learned state determination models 1030 can be both trained and used locally at the computing system 1010. As another example, in some implementations, the computing system 1010 is not connected to other computing systems.

In addition, components illustrated and/or discussed as being included in one of the computing systems 1010 or 1050 can instead be included in another of the computing systems 1010 or 1050. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
receiving sensor data and map data, the sensor data comprising information associated with an environment detected by one or more sensors of a vehicle, wherein the map data comprises information associated with one or more traffic signals in the environment;
generating based at least in part on the sensor data and the map data, an input representation indicative of one or more regions of interest associated with one or more images of the one or more traffic signals, wherein the input representation comprises one or more multi-parameter image representations comprising a plurality of values corresponding to one or more image parameters of the one or more regions of interest associated with the one or more images of the one or more traffic signals;
determining based at least in part on the input representation and a machine-learned model, one or more states of the one or more traffic signals in the environment; and
generating based at least in part on the one or more states of the one or more traffic signals, traffic signal state data comprising a determinative state of the one or more traffic signals.

2. The computer-implemented method of claim 1, wherein generating, based at least in part on the sensor data and the map data, the input representation indicative of the one or more regions of interest associated with the one or more images of the one or more traffic signals comprises:
modifying the one or more regions of interest in the one or more images to be the same size.

3. The computer-implemented method of claim 1, wherein generating based at least in part on the sensor data and the map data, the input representation indicative of the one or more regions of interest associated with the one or more images of the one or more traffic signals comprises:
determining a position of the vehicle relative to the one or more traffic signals; and
transforming, by the computing system, the one or more regions of interest in the one or more images to be the same shape based at least in part on the position of the vehicle relative to the one or more traffic signals.

4. The computer-implemented method of claim 1, wherein the one or more states of the one or more traffic signals comprise an on state associated with a traffic signal being active, an off state associated with a traffic signal being inactive, a green state indicating the vehicle can proceed, a red state indicating the vehicle should stop, a yellow state indicating the vehicle can proceed with caution, a flashing state to modify what another state of the one or more states of the one or more traffic signals is indicating, a straight arrow state to indicate the vehicle can proceed straight ahead, a left turn state to indicate the vehicle can turn left, a right turn state to indicate the vehicle can turn right, or a pedestrian walking state to indicate a pedestrian can cross a road.

5. The computer-implemented method of claim 4, wherein generating based at least in part on the one or more states of the one or more traffic signals, the traffic signal state data comprising the determinative state of the one or more traffic signals comprises:

determining that the determinative state of the one or more traffic signals is the red state when a majority of the one or more regions of interest is at least partly occluded.

6. The computer-implemented method of claim 4, wherein the one or more regions of interest correspond to one or more faces of the one or more traffic signals and comprise one or more sections associated with a corresponding signaling component of the one or more traffic signals, one or more subsets comprising the one or more sections that control the same direction of travel in one face of the one or more faces, or one or more sets comprising the one or more sections that control the same direction of travel across any of the one or more faces.

7. The computer-implemented method of claim 6, wherein generating based at least in part on the one or more states of the one or more traffic signals, the traffic signal state data comprising the determinative state of the one or more traffic signals comprises:

determining the one or more states corresponding to the one or more sections in the one or more subsets; and
   determining the determinative state of the one or more traffic signals based at least in part on the one or more states of a majority of the one or more sections in the one or more subsets when none of the one or more sections are in the red state.

8. The computer-implemented method of claim 6, wherein generating based at least in part on the one or more states of the one or more traffic signals, the traffic signal state data comprising the determinative state of the one or more traffic signals comprises:

determining that the determinative state of the one or more traffic signals is the red state when the one or more sections in either of the one or more subsets or the one or more sets do not indicate the same direction of travel.

9. The computer-implemented method of claim 6, wherein determining based at least in part on the input representation and the machine-learned model, the one or more states of the one or more traffic signals in the environment comprises:

determining based at least in part on the sensor data, that a state of a section of the one or more sections is the flashing state when a brightness of the section alternates between being below a brightness threshold and exceeding the brightness threshold a predetermined number of times within a predetermined time period.

10. The computer-implemented method of claim 1, wherein the map data comprises information associated with one or more locations of the one or more traffic signals in the environment.

11. The computer-implemented method of claim 1, wherein the one or more multi-parameter image representations comprise a respective multi-parameter image representation that includes a first distinct value for an image hue parameter, a second distinct value for an image saturation parameter, and a third distinct value for an image greyscale parameter.

12. The computer-implemented method of claim 1, wherein the one or more multi-parameter image representations comprise a respective multi-parameter image representation that includes a first distinct value for an image luminance parameter, a second distinct value for an image red/green chrominance parameter, and a third distinct value for an image blue/yellow chrominance parameter.

13. The computer-implemented method of claim 1, wherein the one or more multi-parameter image representations comprise a respective multi-parameter image representation that includes a first distinct value for an image saturation parameter, a second distinct value for an image luminance parameter, a third distinct value for an image red/green chrominance parameter, and a fourth distinct value for an image blue/yellow chrominance parameter.

14. A state determination system, comprising:

one or more processors;
   a machine-learned state determination model trained to receive an input representation based at least in part on sensor data and map data, and, responsive to receiving the input representation, generate traffic signal state data comprising one or more traffic signal states;
   a memory comprising one or more computer-readable media, the memory storing computer-readable instructions that when executed by the one or more processors cause the one or more processors to perform operations comprising:
   receiving the sensor data and the map data, the sensor data comprising information associated with an environment detected by one or more sensors of a vehicle, wherein the map data comprises information associated with one or more locations of one or more traffic signals in the environment;
   generating, based at least in part on the sensor data and the map data, the input representation indicative of one or more regions of interest associated with one or more images of the one or more traffic signals, wherein the input representation comprises one or more multi-parameter image representations comprising a plurality of values corresponding to one or more image parameters of the one or more regions of interest associated with the one or more images of the one or more traffic signals;
   providing the input representation as an input to the machine-learned state determination model;
   determining, based at least in part on an output from the machine-learned model state determination model responsive to the input representation, the one or more states of the one or more traffic signals in the environment; and
   generating, based at least in part on the one or more states of the one or more traffic signals, traffic signal state data comprising a determinative state of the one or more traffic signals.

15. The state determination system of claim 14, wherein determining, based at least in part on the sensor data, the map data, and the machine-learned model, the one or more states of the one or more traffic signals comprises:

determining, based at least in part on the sensor data, one or more differences in the one or more states of the one or more traffic signals over a plurality of time intervals; and
   determining that the one or more states of the one or more traffic signals are invalid when the one or more differences in the one or more states of the one or more traffic signals over the plurality of time intervals satisfy one or more invalid state change criteria.

16. The state determination system of claim 15, wherein the one or more invalid state change criteria comprise two or more conflicting states of the one or more traffic signals occurring simultaneously or an invalid transition of the one or more states over successive time intervals of the plurality of time intervals.

17. The state determination system of claim 14, further comprising:

activating, based at least in part on the traffic signal state data, one or more vehicle systems associated with operation of the vehicle, wherein the one or more vehicle systems comprise one or more braking systems, one or more steering systems, or one or more vehicle acceleration systems.

18. A computing device comprising:

one or more processors; and a memory comprising one or more computer-readable media, the memory storing computer-readable instructions that when executed by the one or more processors cause the one or more processors to perform operations comprising:

receiving sensor data and map data, the sensor data comprising information associated with an environment detected by one or more sensors of a vehicle, wherein the map data comprises information associated with one or more locations of one or more traffic signals in the environment;

generating, based at least in part on the sensor data and the map data, an input representation indicative of one or more regions of interest associated with one or more images of the one or more traffic signals, wherein the input representation comprises one or more multi-parameter image representations comprising a plurality of values corresponding to one or more image parameters of the one or more regions of interest associated with the one or more images of the one or more traffic signals;

determining, based at least in part on the input representation and a machine-learned model, one or more states of the one or more traffic signals in the environment; and generating, based at least in part on the one or more states of the one or more traffic signals, traffic signal state data comprising a determinative state of the one or more traffic signals.

19. The computing device of claim 18, wherein generating, based at least in part on the sensor data and the map data, the input representation indicative of the one or more regions of interest associated with the one or more images of the one or more traffic signals in the environment comprises:

adjusting one or more properties of the one or more images, wherein adjusting the one or more properties comprises underexposing the one or more images, modifying a light intensity associated with the one or more images, modifying a hue associated with the one or more images, or modifying a saturation associated with the one or more images.

20. The computing device of claim 18, further comprising:

training the machine-learned model based at least in part on a plurality of training images comprising one or more shapes, wherein the plurality of training images is associated with a plurality of features and a plurality of shape labels corresponding to the one or more shapes within the plurality of training images, and wherein the plurality of shape labels are independent of a location of the one or more shapes within each of the plurality of training images.

* * * * *